(12) United States Patent
McKee et al.

(10) Patent No.: US 8,129,665 B2
(45) Date of Patent: *Mar. 6, 2012

(54) APPARATUS AND METHOD FOR HEATING OR COOLING AN OBJECT USING A FLUID

(75) Inventors: Philip R. McKee, Frisco, TX (US); Earl R. Winkelmann, Garland, TX (US)

(73) Assignee: Appliance Scientific, Inc., Dallas, TX (US)

( * ) Notice: Subject to any disclaimer, the term of this patent is extended or adjusted under 35 U.S.C. 154(b) by 327 days.

This patent is subject to a terminal disclaimer.

(21) Appl. No.: 12/347,303

(22) Filed: Dec. 31, 2008

(65) Prior Publication Data

US 2009/0166002 A1 Jul. 2, 2009

Related U.S. Application Data

(63) Continuation-in-part of application No. 12/266,251, filed on Nov. 6, 2008, now Pat. No. 8,022,341, which is a continuation-in-part of application No. 12/120,497, filed on May 14, 2008, now Pat. No. 8,026,463, which is a continuation-in-part of application No. 11/803,787, filed on May 15, 2007, now Pat. No. 7,435,931.

(51) Int. Cl.
*H05B 6/80* (2006.01)
*H05B 6/68* (2006.01)

(52) U.S. Cl. ................................. 219/680; 219/678

(58) Field of Classification Search .............. 219/680, 219/682–684, 686–689, 707, 756–758
See application file for complete search history.

(56) References Cited

U.S. PATENT DOCUMENTS

| 2,617,966 | A | 11/1952 | Kilgore |
| 3,397,817 | A | 8/1968 | Smith |
| 3,767,883 | A | 10/1973 | Staats |
| 3,884,213 | A | 5/1975 | Smith |
| 4,332,992 | A | 6/1982 | Larsen |
| 4,335,290 | A | 6/1982 | Teich |
| 4,523,391 | A | 6/1985 | Smith et al. |
| 4,876,426 | A | 10/1989 | Smith |

(Continued)

FOREIGN PATENT DOCUMENTS

WO 2008140854 11/2008

(Continued)

OTHER PUBLICATIONS

International Search Report dated Jun. 27, 2008 for PCT/US2008/055518.

(Continued)

*Primary Examiner* — Daniel L Robinson
(74) *Attorney, Agent, or Firm* — Ohlandt, Greeley, Ruggiero & Perle, L.L.P.

(57) ABSTRACT

An improved heating apparatus is aimed at optimizing heat transfer and delivering an optimal heating efficiency in comparison to conventional heating apparatus. The improved heating apparatus includes tubes that generate plume arrays of a fluid (e.g., a gas, such as air) that is heated in a conduit. The tubes introduce the heated fluid into a chamber of the heating apparatus. The fluid is returned to the conduit through a return opening in the chamber. The path that the fluid travels in the chamber, from the tubes to the return air opening, is provided such that optimized heat transfer and optimal heating efficiency are facilitated.

23 Claims, 23 Drawing Sheets

U.S. PATENT DOCUMENTS

| | | | |
|---|---|---|---|
| 5,122,633 A * | 6/1992 | Moshammer et al. | 219/687 |
| 5,128,158 A | 7/1992 | Chartrain et al. | |
| 5,166,487 A | 11/1992 | Hurley et al. | |
| 5,254,823 A | 10/1993 | McKee et al. | |
| 5,272,299 A | 12/1993 | Ovadia | |
| 5,290,575 A * | 3/1994 | Torikata | 426/233 |
| 5,401,940 A | 3/1995 | Smith et al. | |
| 5,416,304 A | 5/1995 | De La Cruz | |
| 5,434,390 A | 7/1995 | McKee et al. | |
| 5,483,044 A | 1/1996 | Thorneywork et al. | |
| 5,556,566 A | 9/1996 | Cappello et al. | |
| 5,558,793 A | 9/1996 | McKee et al. | |
| 5,676,870 A | 10/1997 | Wasserman et al. | |
| 5,683,240 A | 11/1997 | Smith | |
| 5,816,234 A | 10/1998 | Vasan | |
| 5,818,014 A | 10/1998 | Smith et al. | |
| 5,897,807 A | 4/1999 | Edgar et al. | |
| 5,927,265 A | 7/1999 | McKee et al. | |
| 5,928,541 A | 7/1999 | Tsukamoto et al. | |
| 5,958,274 A | 9/1999 | Dobie et al. | |
| 5,990,466 A | 11/1999 | McKee et al. | |
| 6,008,483 A | 12/1999 | McKee et al. | |
| 6,054,695 A * | 4/2000 | Lautenschlager | 219/687 |
| 6,060,701 A | 5/2000 | McKee et al. | |
| 6,140,626 A | 10/2000 | McKee et al. | |
| 6,262,406 B1 | 7/2001 | McKee et al. | |
| 6,281,484 B2 | 8/2001 | Thomas | |
| 6,307,190 B1 | 10/2001 | Thomas | |
| 6,392,211 B2 | 5/2002 | Kim et al. | |
| 6,403,937 B1 | 6/2002 | Day et al. | |
| 6,486,453 B1 | 11/2002 | Bales et al. | |
| 6,568,215 B2 | 5/2003 | Schofield et al. | |
| 6,716,467 B2 | 4/2004 | Cole | |
| 6,768,087 B2 | 7/2004 | Kikuchi | |
| 6,805,112 B2 | 10/2004 | Cole et al. | |
| 6,874,495 B2 | 4/2005 | McFadden | |
| 6,927,371 B1 | 8/2005 | Hargett et al. | |
| 7,055,518 B2 | 6/2006 | McFadden et al. | |
| 7,087,872 B1 | 8/2006 | Dobie et al. | |
| 7,435,931 B1 * | 10/2008 | McKee et al. | 219/683 |
| 2001/0003338 A1 * | 6/2001 | Schulz et al. | 219/687 |
| 2003/0038131 A1 * | 2/2003 | Nomura et al. | 219/735 |
| 2005/0205566 A1 | 9/2005 | Kassayan | |
| 2005/0217503 A1 | 10/2005 | McFadden | |
| 2005/0236388 A1 | 10/2005 | Goranson | |
| 2006/0191918 A1 | 8/2006 | Ashford et al. | |
| 2007/0137633 A1 | 6/2007 | McFadden | |
| 2008/0283519 A1 | 11/2008 | McKee et al. | 219/680 |

FOREIGN PATENT DOCUMENTS

| | | |
|---|---|---|
| WO | 2008143942 | 11/2008 |

OTHER PUBLICATIONS

Written Opinion of the International Searching Authority dated Jun. 27, 2008 for PCT/US2008/055518.

International Search Report dated Nov. 13, 20008 for PCT/US2008/006246.

Written Opinion of the International Searching Authority dated Nov. 13, 2008 for PCT/US2008/006246.

International Search Report issued Jun. 18, 2010 in the related PCT/US2010/031299.

* cited by examiner

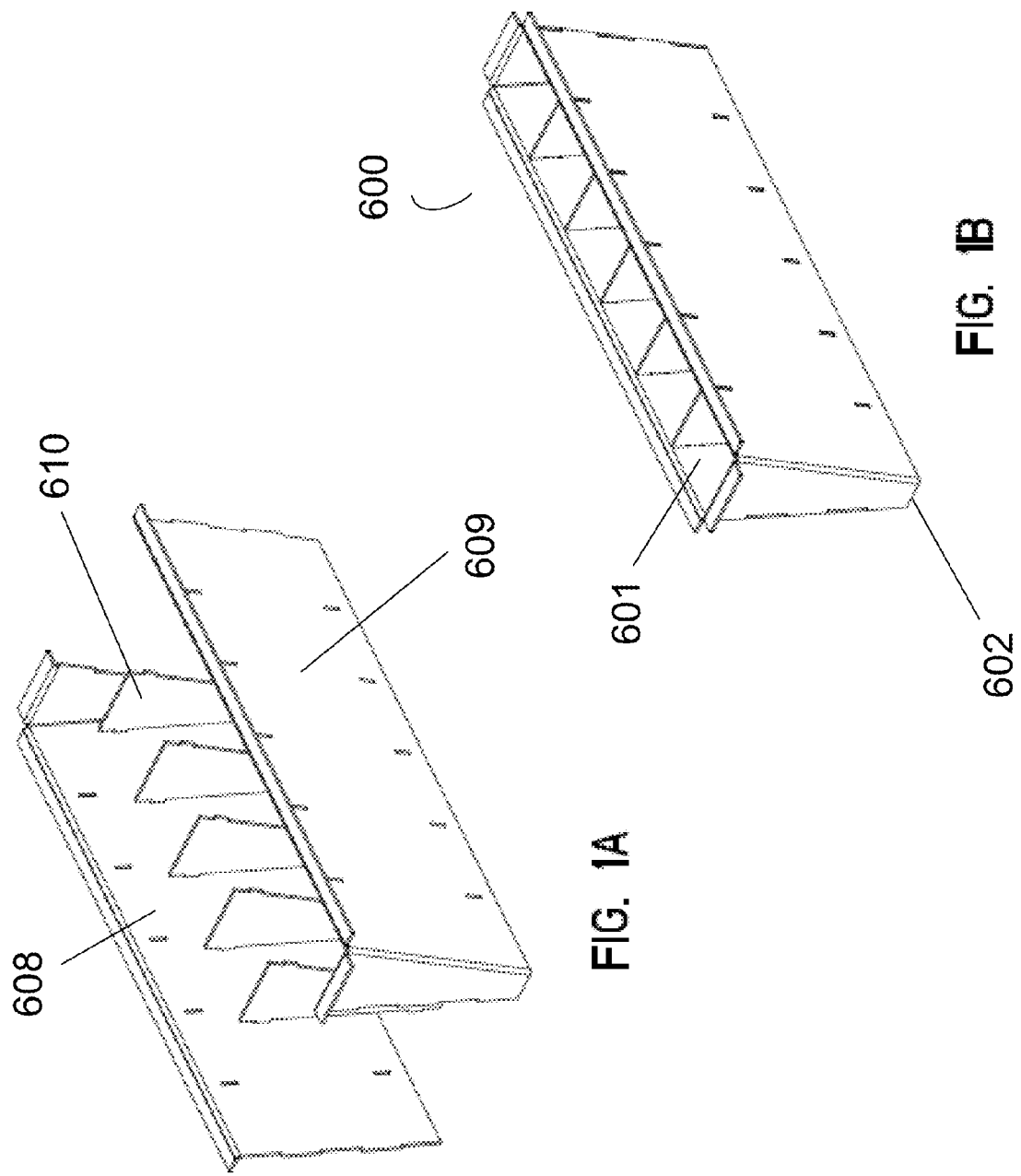

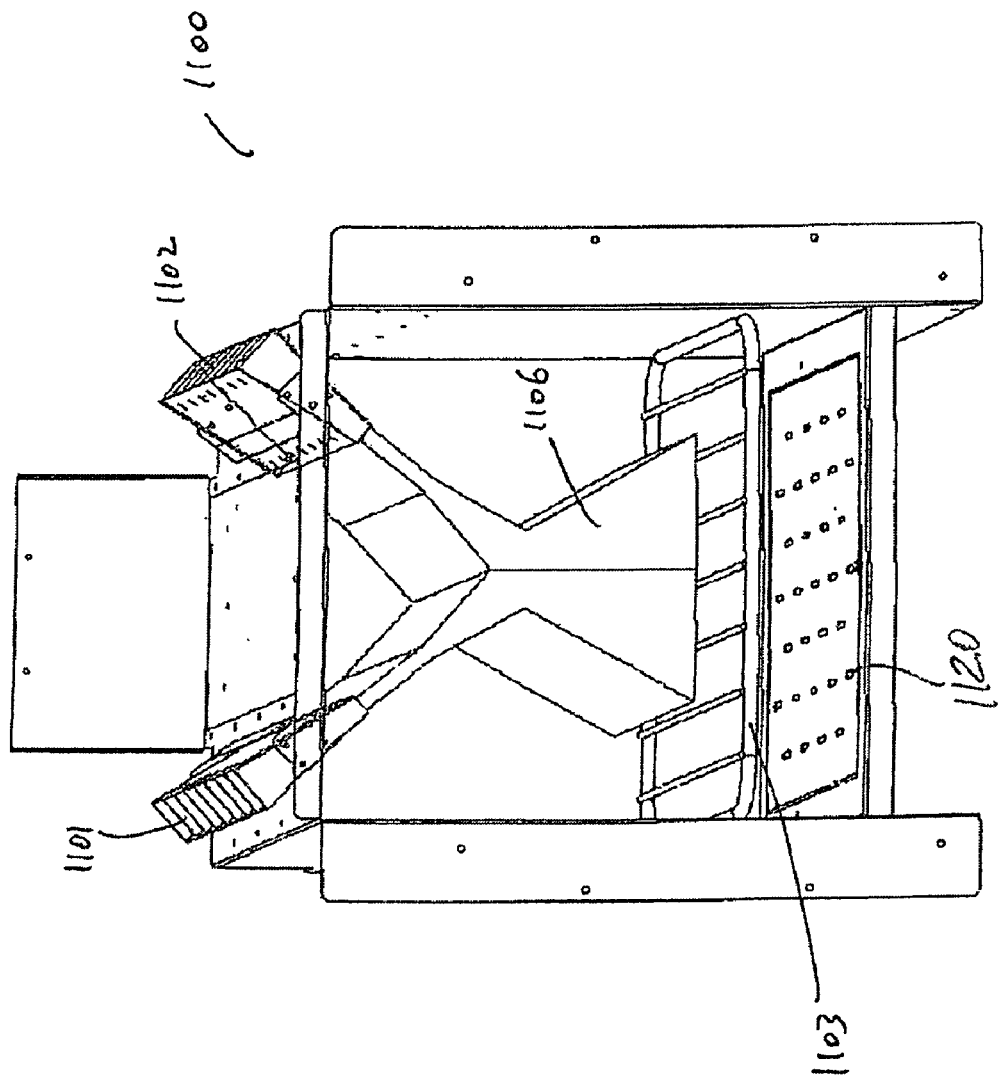

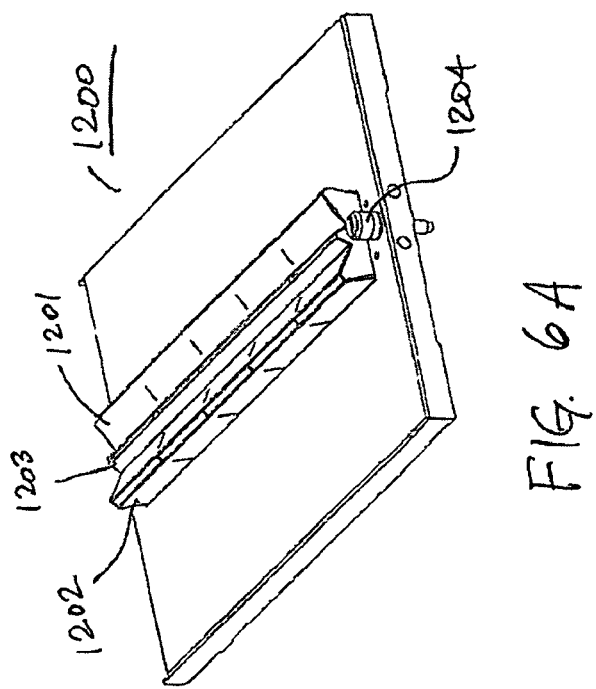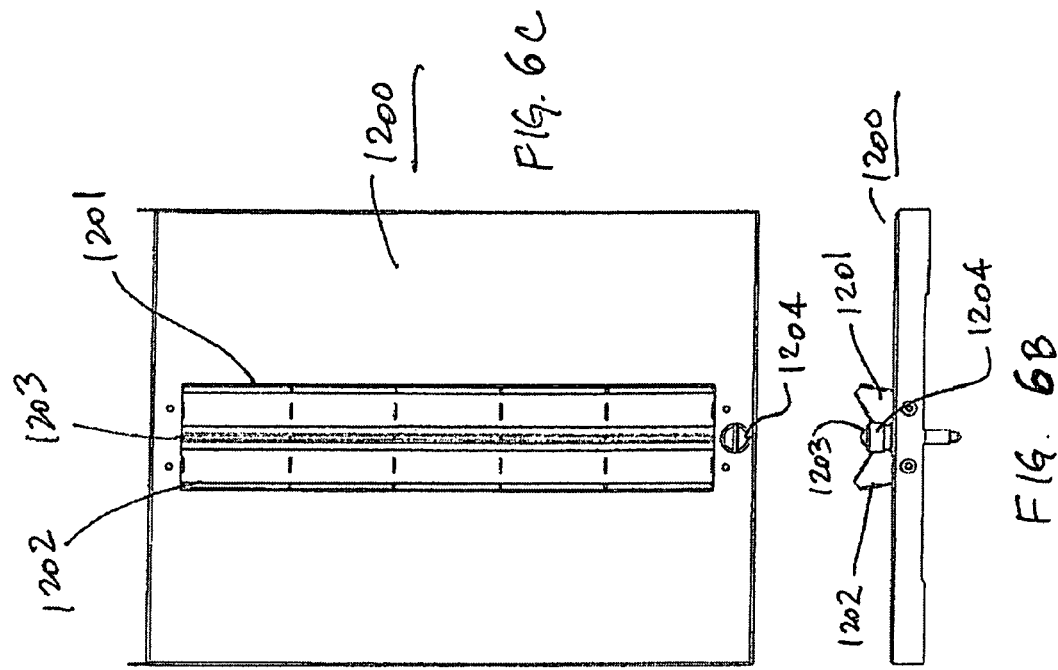

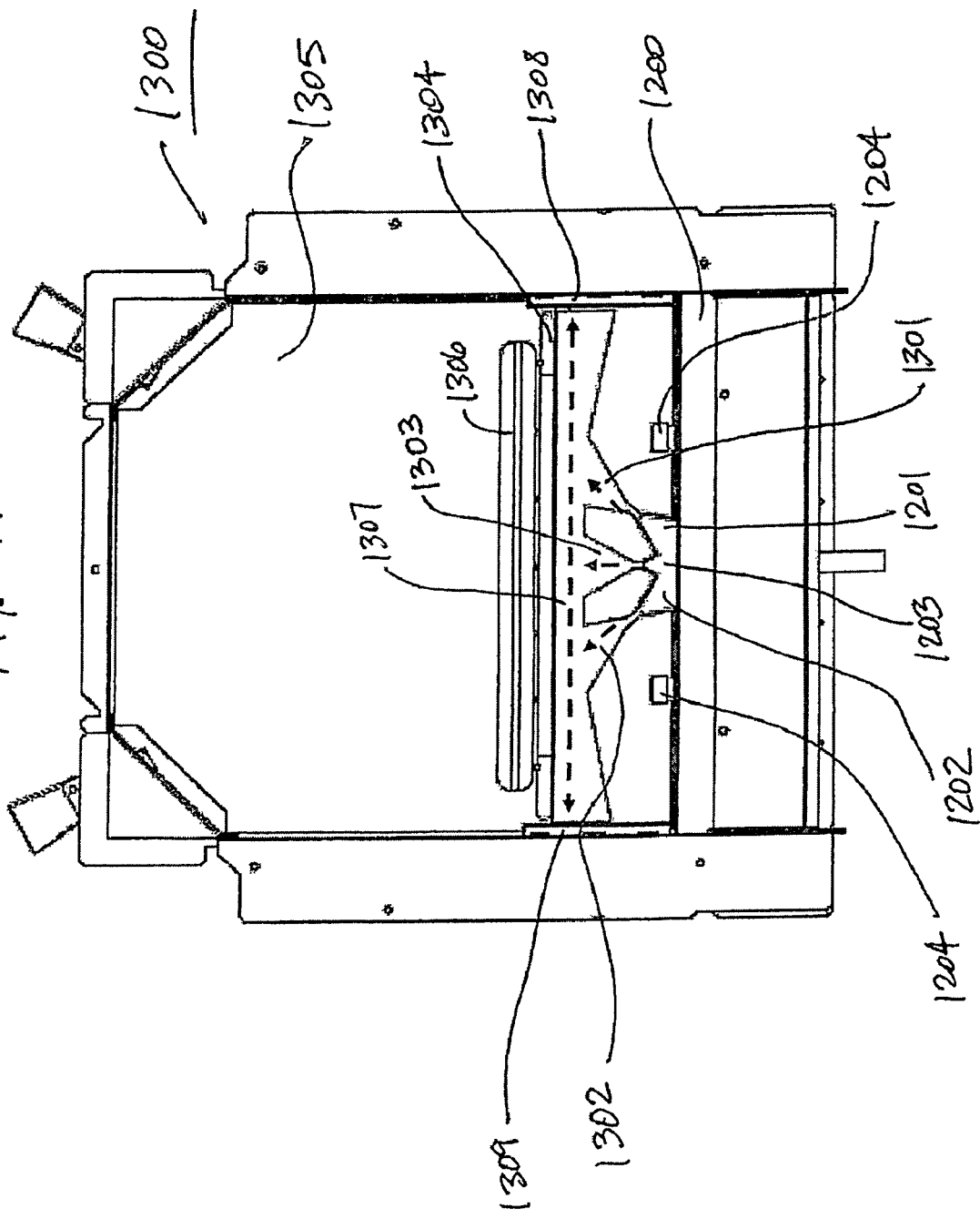

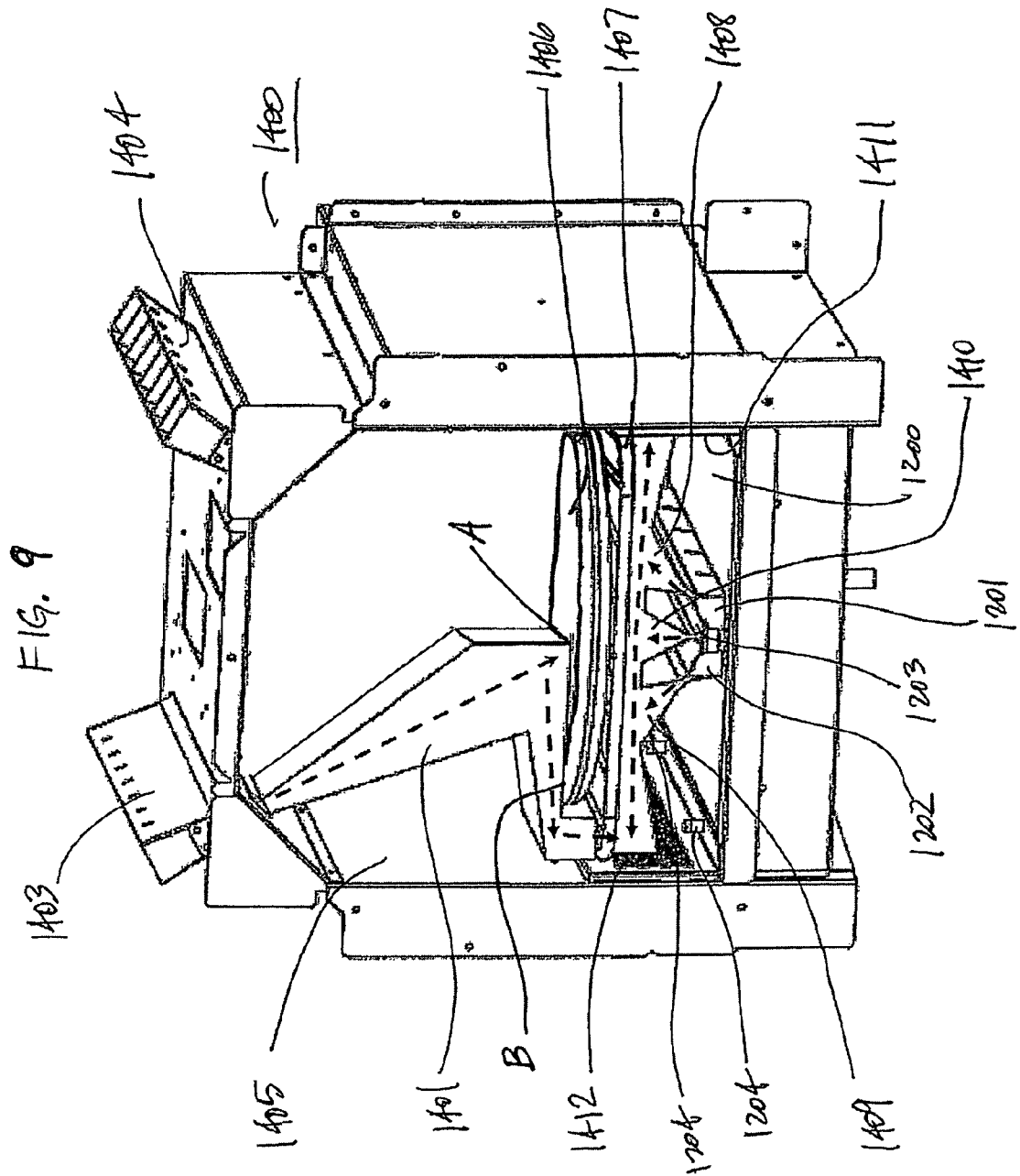

APPARATUS AND METHOD FOR HEATING OR COOLING AN OBJECT USING A FLUID

CROSS-REFERENCE TO RELATED APPLICATIONS

This patent application is a continuation-in-part of U.S. patent application Ser. No. 12/266,251, filed on Nov. 6, 2008, which is a continuation-in-part of U.S. patent application Ser. No. 12/120,497, filed on May 14, 2008, which is a continuation-in-part of U.S. patent application Ser. No. 11/803,787, filed on May 15, 2007, now U.S. Pat. No. 7,435,931. The contents of each of these related patent applications are incorporated herein by reference in their entirety.

FIELD OF INVENTION

The present invention generally relates to the transfer of heat from a fluid to an object. More particularly, the present invention relates to an apparatus and method for heating or cooling an object in which the fluid travels along a specified path.

BACKGROUND OF THE INVENTION

Hot air impingement is one method for heating an object. This method is based on the transfer of heat from a fluid (e.g., a gas, such as air) that has a higher temperature to an object that has a lower temperature, thereby changing the internal energy of the fluid and the object in accordance with the first law of thermodynamics.

The fundamental principle of a heating apparatus is conversion of available power (e.g., electric power) into heat energy that is directed to, and absorbed by, an object located in the apparatus to raise the temperature of the object. Accordingly, achieving an optimal heating efficiency requires maximizing (1) the amount of heat energy that is converted from a given input power; (2) the amount of the heat energy that is directed to an object in the apparatus; and (3) the amount of the heat energy that is absorbed and retained by the object.

As an object resides in an apparatus that provides a surrounding hot air environment (such as an oven), temperature gradients, or several boundary layers, form around the cooler object. The apparatus heats the object by transferring heat energy to the object through these temperature gradients. Forced air convection by, for example, a fan can improve the heat transfer by "wiping away" the temperature gradients around the object and bringing the higher temperature air closer to the object.

Hot air impingement can further improve the heat transfer by "piercing" the temperature gradients with jets of hot air and bringing the air at higher temperature closer to the surface of the object. However, significant portions of the electric power and the heat energy from the hot air impingement are lost in the process to the walls of the apparatus, to various openings, and to the plenum and air blower that form the hot air circulation and delivery system of the apparatus.

As illustrated in FIG. 10A, hot air impingement uses columns 1604 of hot air from hot air jet holes 1606 that are disposed in an upper wall of a chamber (not shown), above an object 1602. One of ordinary skill in the art would understand that the hot air jet holes 1606 could also be disposed in a bottom surface of the chamber, or in a side wall of the chamber, so that the hot air impingement could occur from, respectively, below the object or a side of the object, as well. The columns 1604 are formed by moving the hot air through the holes 1606 at a high velocity. The chamber typically includes a return opening 1608 that is provided in its back wall.

As shown in FIG. 10A, only 19 of the 27 columns 1604 of air impact object 1602. This reduces the efficiency of the hot air impingement. As shown in FIG. 10B, another well-known problem with the technique of hot air impingement is "spotting" in the areas directly impacted by the hot air jets, causing uneven heating or scorching of the surface of the object 1602. While this problem may be resolved by, for example, reducing the hot air velocity and/or increasing the diameter of the columns 1604 of impinging hot air, such solutions may further reduce the efficiency of the hot air impingement. In addition, the diameter/cross-sectional area of a column of hot air impingement generally increases as the distance from the hot air jet orifice increases, thereby reducing the efficiency of hot air impingement. While this problem may be solved by increasing the hot air velocity, such solution may further aggravate the spotting problem.

Hot air jet holes 1606 are separated from each other by a distance that is sufficient to allow the air that rebounds off object 1602 to form various paths to return opening 1608. Such paths are shown in FIG. 10B. Referring to FIGS. 10A and 10B, after columns 1604 of hot air strike object 1602, the rebounded air from each column 1604 travels a different path to return opening 1608. In particular, the air does not follow a uniform path from the time it enters the chamber until it reaches the return opening. Because the path of the rebounded air to the return opening 1608 is somewhat circuitous, a large pressure drop is generated along the path. Consequently, more force is required to return the air to the blower that provides the air to the chamber (not shown).

In addition to traveling different paths, the rebounded air from each column 1604 of hot air travels, for the most part, different distances to return opening 1608 after striking object 1602. As seen in FIG. 10B, air that strikes object 1602 farthest away from return opening 1608 must travel the entire length of object 1608 to get to return opening 1608, while air that strikes object 1602 nearer return opening 1608 travels a shorter distance to reach return opening 1608. Accordingly, the portion of object 1602 near the return opening 1608 comes in contact with a larger volume of return air than do the portions of object 1602 that are farther away from return opening 1608. This is one of the factors that contribute to uneven heating of object 1602.

Thus, it is an object of the present invention to eliminate or reduce some of the inefficiencies when heating an object using a fluid.

It is yet another object of the present invention to optimize the efficiency of heating an object when using hot air impingement.

It is yet another object of the present invention to resolve the spotting problem without compromising the efficiency of heating an object using hot air impingement.

It is an even further object of the present invention to cause the air to travel along a uniform path from the time it enters the chamber until it reaches the return opening.

It is yet another object of the present invention to cause all portions of the surface of the object to be in contact with substantially the same volume of air.

It is yet another object of the present invention to reduce the pressure drop of the air from the time it enters the chamber until it reaches the return opening.

Other objects and advantages of the present invention will become apparent from the following description.

SUMMARY OF THE INVENTION

It has now been found that the above-mentioned and related objects of the present invention are obtained in the form of several separate, but related, aspects including an apparatus and method for heating an object using a fluid in which the fluid travels along a path such that the fluid remains in the same top-to-bottom plane from the time it enters the chamber until it reaches the return opening.

More particularly, an apparatus for heating an object using a gas in accordance with an exemplary embodiment of the present invention comprises a chamber for receiving the object, a conduit and one or more blowers for providing the gas into the chamber, a thermal energy source for heating the gas disposed in the conduit, a tube for generating a plume array of the heated gas from the conduit and introducing it into the chamber, and a return opening for allowing the gas from the plume array to return from the chamber to the conduit, wherein the gas flowing in a cross section of the plume array remains in substantially the same plane while it is in the chamber.

In at least one embodiment, the chamber comprises a side wall and a bottom, and the return opening is positioned substantially at or along an intersection of the bottom of the chamber and the side wall of the chamber.

In at least one embodiment, the heated gas of the plume array is drawn laterally across a surface of the object toward the return opening.

In at least one embodiment, a modulator controls a flow rate of the heated gas through the tube.

In at least one embodiment, the tube comprises a tube inlet coupled to the conduit and a tube outlet coupled to the chamber.

In at least one embodiment, the tube is in the shape of an inverted truncated triangular prism, with the tube inlet corresponding to the base of the prism.

In at least one embodiment, the area of the tube inlet is larger than the area of the tube outlet at a ratio substantially sufficient for forming a tight plume of the heated gas.

In at least one embodiment, the dimensions of the tube are designed to optimize the formation of a plume of the heated gas having a long and narrow rectangular cross section.

In at least one embodiment, the gas comprises air and the one or more blowers comprise an air blower that directs the air in the conduit to the tube.

In at least one embodiment, the gas comprises air and the one or more blowers comprise a variable speed air blower.

In at least one embodiment, all of the gas in the plume array travels substantially the same distance from the tube to the return opening.

In at least one embodiment, each portion of the surface of the object that is in contact with the plume array is in contact with substantially the same volume of gas.

An apparatus for heating an object using a gas in accordance with another exemplary embodiment of the present invention comprises a chamber for receiving the object, a conduit and one or more air blowers for providing the air into the chamber, a thermal energy source for heating the air disposed in the conduit, a tube for generating a plume array of the heated air from the conduit and introducing it into the chamber; and a return opening for allowing the air from the plume array to return from the chamber to the conduit, wherein each portion of the surface of the object that is in contact with the plume array is in contact with substantially the same volume of air.

In at least one embodiment, the chamber comprises a side wall and a bottom, and the return opening is positioned substantially at or along an intersection of the bottom of the chamber and the side wall of the chamber.

In at least one embodiment, the heated air of the plume array is drawn laterally across a surface of the object toward the return opening.

In at least one embodiment, an air modulator controls a flow rate of the heated air through the tube.

In at least one embodiment, the tube comprises a tube inlet coupled to the conduit and a tube outlet coupled to the chamber.

In at least one embodiment, the tube is in the shape of an inverted truncated triangular prism with the tube inlet corresponding to the base of the prism.

In at least one embodiment, the area of the tube inlet is larger than the area of the tube outlet at a ratio substantially sufficient for forming a tight plume of the heated air.

In at least one embodiment, the dimensions of the tube are designed to optimize the formation of a plume of the heated gas having a long and narrow rectangular cross section.

In at least one embodiment, the one or more air blowers comprise an air blower that directs the air in the conduit to the tube.

In at least one embodiment, the one or more air blowers comprise a variable speed air blower.

In at least one embodiment, the air flowing in a cross section of the plume array remains in substantially the same plane while it is in the chamber.

In at least one embodiment, all of the air in the plume array travels substantially the same distance from the tube to the return opening.

A method for heating an object using a gas in accordance with another exemplary embodiment of the present invention comprises the steps of providing a chamber for receiving the object, providing a conduit, introducing a gas into the conduit, heating the gas that is in the conduit, forming the heated gas into a plume array such that the gas flowing in a cross section of the plume array remains in substantially the same plane while it is in the chamber, introducing the plume array of heated gas into the chamber, and providing a return opening to allow the gas from the plume array to return from the chamber to the conduit.

In at least one embodiment, a side wall and a bottom are provided for the chamber.

In at least one embodiment, the return opening is positioned substantially at or along the intersection of the bottom of the chamber and the side wall of the chamber.

In at least one embodiment, the heated gas of the plume array is drawn laterally across a surface of the object toward the return opening.

In at least one embodiment, the flow rate of the heated gas through the tube is controlled.

In at least one embodiment, the heated gas is formed into a plume array using a tube having an inlet and an outlet.

In at least one embodiment, the tube inlet is coupled to the conduit and the tube outlet is coupled to the chamber.

In at least one embodiment, the tube is provided in the shape of an inverted truncated triangular prism, with the tube inlet corresponding to the base of the prism.

In at least one embodiment, the tube is provided such that the area of the tube inlet is larger than the area of the tube outlet at a ratio substantially sufficient for forming a tight plume of the heated gas.

In at least one embodiment, the formation of the plume array of the heated gas is optimized to have a long and narrow rectangular cross section.

In at least one embodiment, the plume array of heated gas is introduced into the chamber by directing the heated gas from the conduit into the tube.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiments of the present invention when taken in conjunction with the accompanying figures, wherein:

FIGS. 1A, 1B, 1C, and 1D illustrate a tube used for hot air impingement in an embodiment of the present invention.

FIGS. 5A, 5B, and 5C respectively illustrate plume arrays generated by two tubes in at least one embodiment of the present invention.

FIGS. 6A, 6B, and 6C illustrate various views of a bottom plate used in accordance with another embodiment of the present invention.

FIGS. 7A and 7B illustrate plume arrays generated in at least one embodiment of the present invention.

FIG. 9 illustrates another embodiment of the present invention.

DETAILED DESCRIPTION OF PREFERRED EMBODIMENTS

Figure 1C:
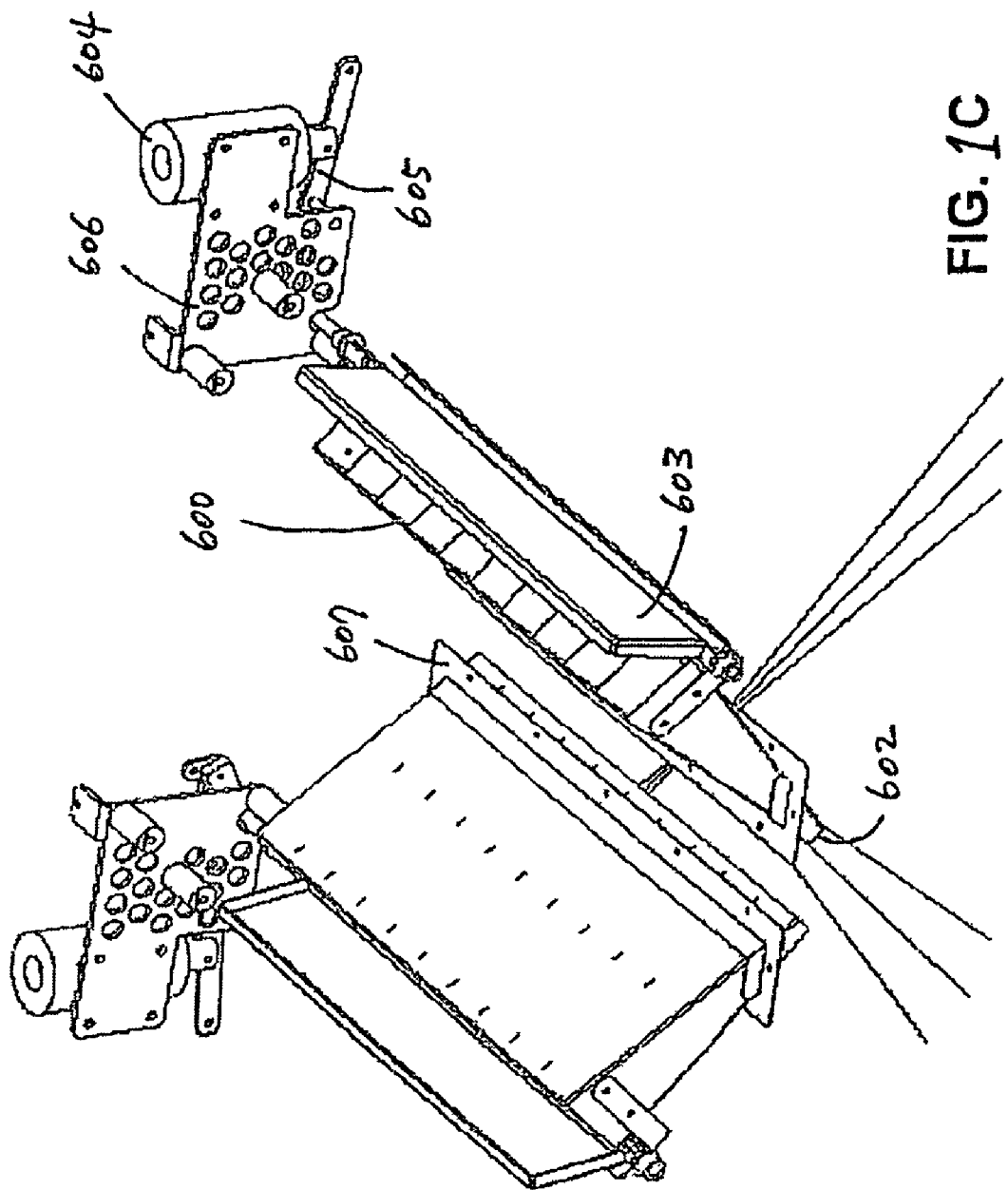

While the present invention will be described in terms of a heating apparatus, it will be apparent to those skilled in the art that the present invention can be implemented in any apparatus that heats an object using a fluid (e.g., a gas, such as air), and can be used for any application that requires accelerated or efficient heating of an object. In this connection, the terms "heats," "heating," or other variations thereof are intended to mean the transfer of heat to or from an object, and expressly includes cooling.

In at least one embodiment of the present invention, a heating apparatus comprises a chamber, which is adapted to receive an object on a support that is disposed within the chamber. The chamber includes a top, a bottom, and side walls. A tube, as shown in FIG. 1B, may be used to provide hot air flow or impingement into the chamber. FIGS. 1A and 1B respectively illustrate one possible example of a tube before and after assembly. FIG. 1A shows components 608 and 609 for a tube body and one or more slats or spacers 610. These components may be made of sheet metal. FIG. 1B shows the tube 600 after these components are assembled together. Each tube has a tube inlet 601 coupled to an air conduit and/or air inlet housing of the heating apparatus to receive a heated fluid (e.g., air), and a tube outlet 602 coupled to the chamber to provide the heated air into the chamber in the form of a hot air plume array.

In this exemplary embodiment, the tube 600 may be in the shape of an inverted truncated triangular prism, with the tube inlet 601 corresponding to the base of the prism and the tube outlet 602 corresponding to the truncated top of the prism. As shown in FIG. 1B, the tube inlet 601 is larger than the tube outlet 602 at a ratio optimized to form a tight plume of heated gas. Preferably, the dimension of the tube 600 is designed to optimize the formation of a plume array of heated gas and thereby the performance of the heating apparatus. The length of the tube is preferably long enough to establish a directional flow of heated gas in the form of a plume, but not too long so as to require the height of the heating apparatus to be objectionable in terms of cost and size considerations. Each tube is preferably wide enough to introduce a sufficient volume of heated gas into the chamber to rapidly heat an object in the heating apparatus. At the same time, the tube outlet 602 is preferably narrow to facilitate the formation of a tight plume.

The tube 600 illustrated in FIG. 1B is an exemplary embodiment taking into account these foregoing considerations. Unlike prior art columns of heated air having a row of circular cross sections, such as the ones shown in FIG. 10A, a plume array generated by the tube 600 in FIG. 1B is a planar band of moving heated gas having a rectangular cross section, substantially narrow in one direction but substantially wide in the perpendicular direction.

As shown in FIGS. 1A and 1B, the slats or spacers 610 may be placed within the inside of the tube 600, uniformly spaced in parallel. The spacers 610 serve to prevent microwave energies in a chamber (if present) from entering the tube 600. For this purpose, the spacers 610 are preferably less than 1.2 inches spaced apart from each other. FIGS. 1A and 1B show that each of the spacers 610 may extend from the tube outlet 602 to the tube inlet 601. In an alternative embodiment, each spacer 610 may extend, for example, only about half an inch inward from the tube outlet 602. While both examples serve to substantially prevent microwave entry into the tube 600, it appears that the longer version of the spacer 610, extending from the tube outlet 602 to the tube inlet 601 as shown in FIGS. 1A and 1B, better enables the evenness of the hot air flow along the width of the tube compared to the shorter version.

Figure 1D:
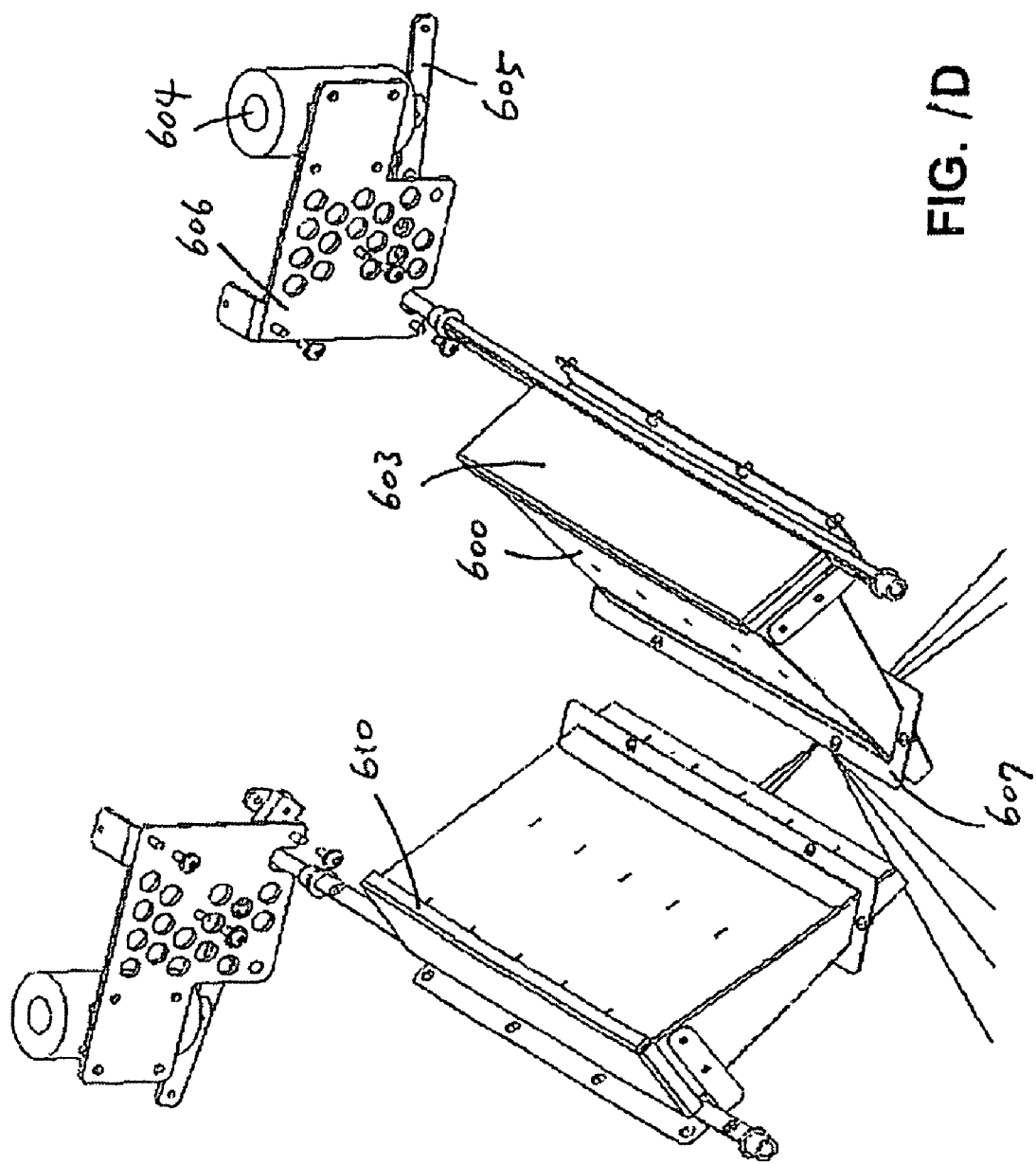

A flap 603 as shown in FIG. 1C may be used to control the air flow through the tube 600 by covering and opening the tube inlets 601. The flap 603 may be moved to open and close the tube 600 by a lever arm 605, which may be in turn driven by a solenoid 604. FIG. 1C shows the flap 603 in open position and FIG. 1D shows the flap 603 in closed position. A bracket 606 may be provided to hold the solenoid 604 and the lever arm 605. Preferably, the bracket 606 is designed to minimize heat transfer from the apparatus plenum to the solenoid 604. As shown in FIG. 1D, the flap 603 preferably has substantially louvered edges 610 or other means to minimize any air leakage through the flap when closed.

In an alternative embodiment not shown in any drawing, one or more motors may drive the opening and closing of the flap. In another alternative embodiment, a heating apparatus with two tubes may have one motor driving the two flaps for the two tubes. The motor may be configured to open the flap for one tube, while keeping the other tube closed, permitting the alternate opening and closing between the two tubes.

For a heating apparatus having a bottom air plenum through which a portion of heated air can be diverted to the bottom of the chamber, the flap 603 may also serve as a damper valve or bottom air diverter. By controlling the degree of opening of the flap 603 for letting the heated air in through the tube 600, one may at the same time control the amount of heated air diverted to the bottom air plenum.

Referring back to FIG. 1C, the surrounding area 607 where the tube 600 penetrates the top of a chamber is preferably firmly sealed to prevent any air leakage into the chamber.

The exemplary embodiment of the present invention incorporating the tube 600 as means of hot air impingement may further comprise a return opening for allowing the gas from the plume arrays generated by the tube 600 to return from the chamber to the air conduit. One example of such a return opening is one or more rectangular openings. Preferably, the return opening is positioned substantially at or along the intersection of the direction of the plume array and a side wall of the chamber. In this configuration, the heated air from the plume array generated by the tube 600 would strike an object at an angle and is drawn across the surface of the object toward its edges and the edge of the support and then finally toward the return opening. It is found that this configuration further improves the heat transfer between the heated gas and the object.

Figure 2A:
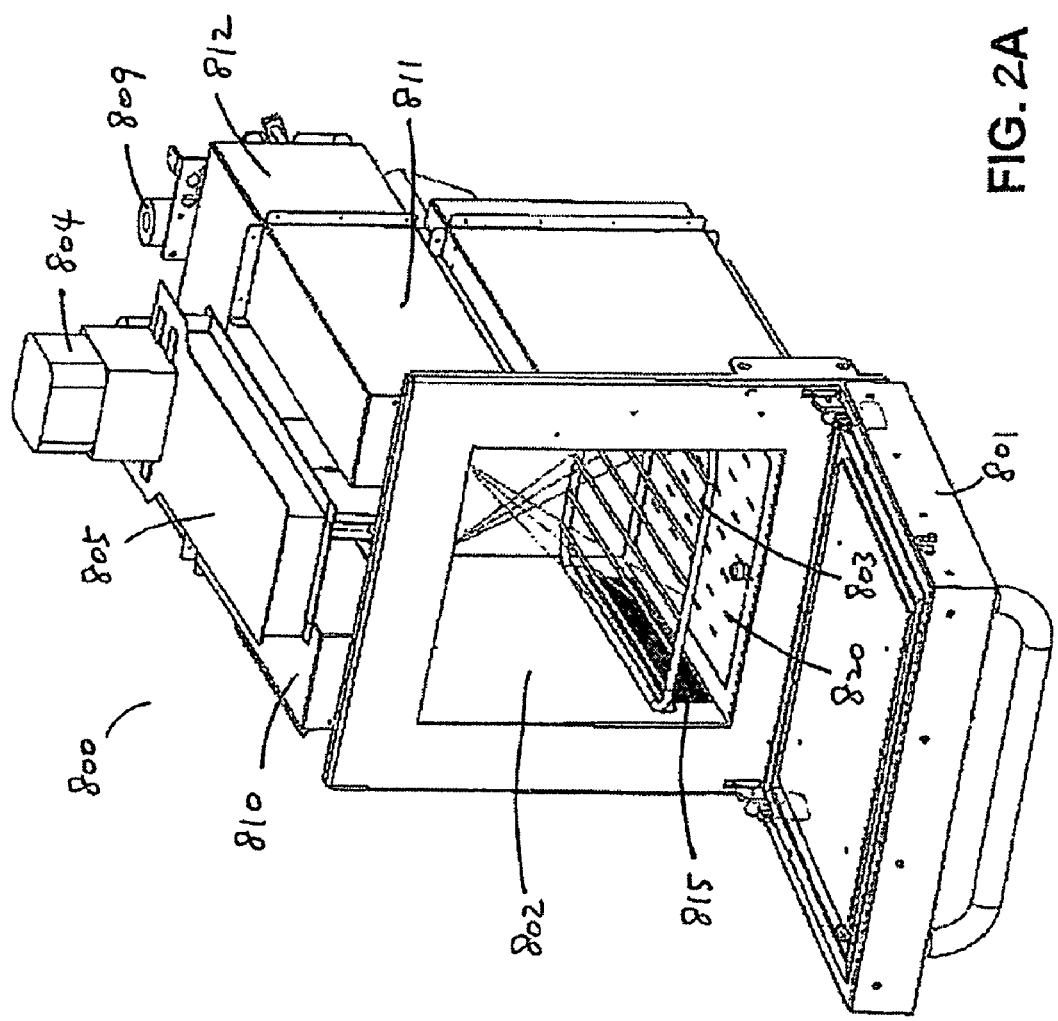
FIGS. 2A, 2B, and 2C illustrate various views of another embodiment of the present invention.
Figure 2B:
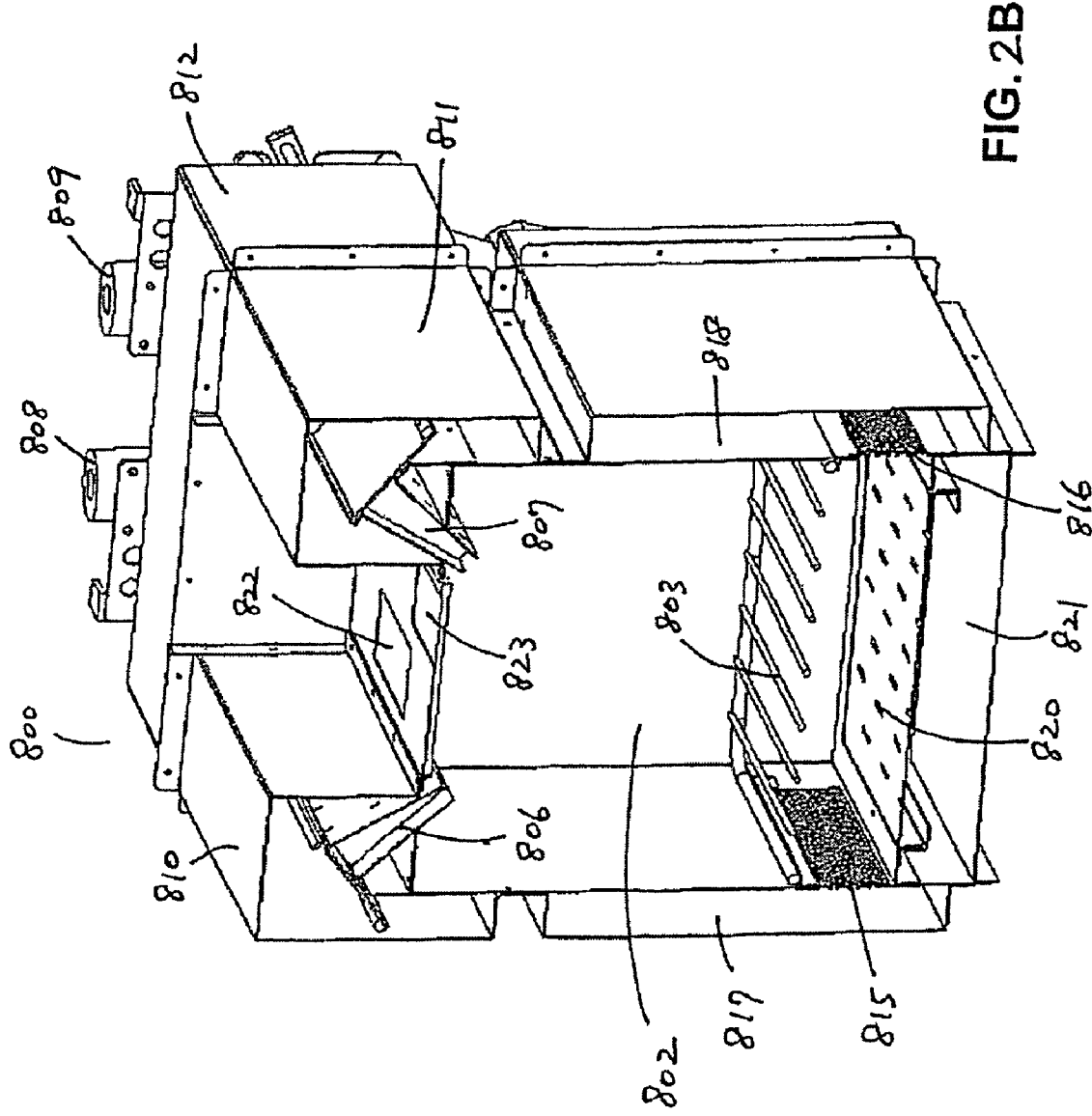
Figure 2C:
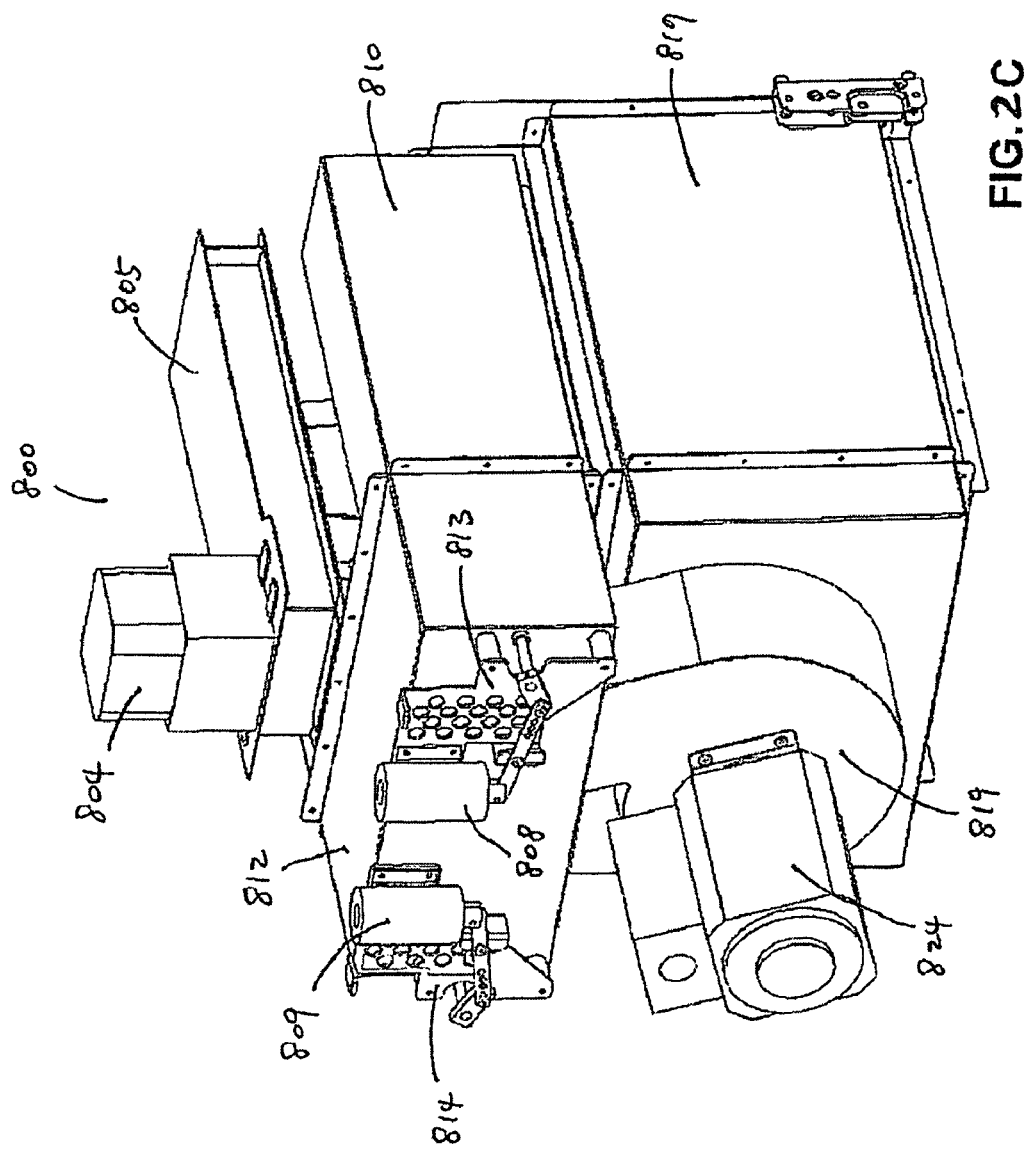
Figure 3A:
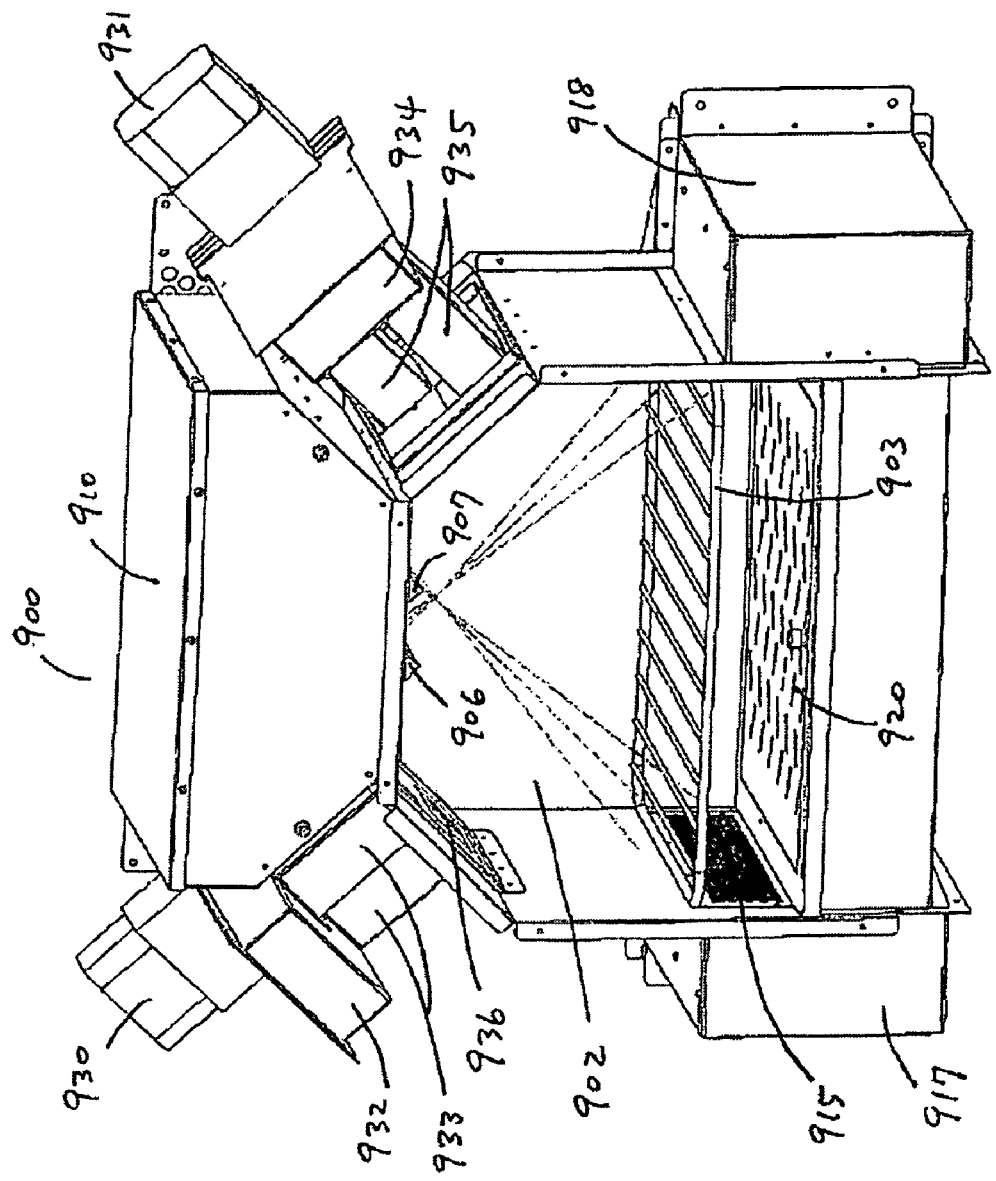
FIGS. 3A, 3B, and 3C illustrate various views of another embodiment of the present invention.
Figure 3B:
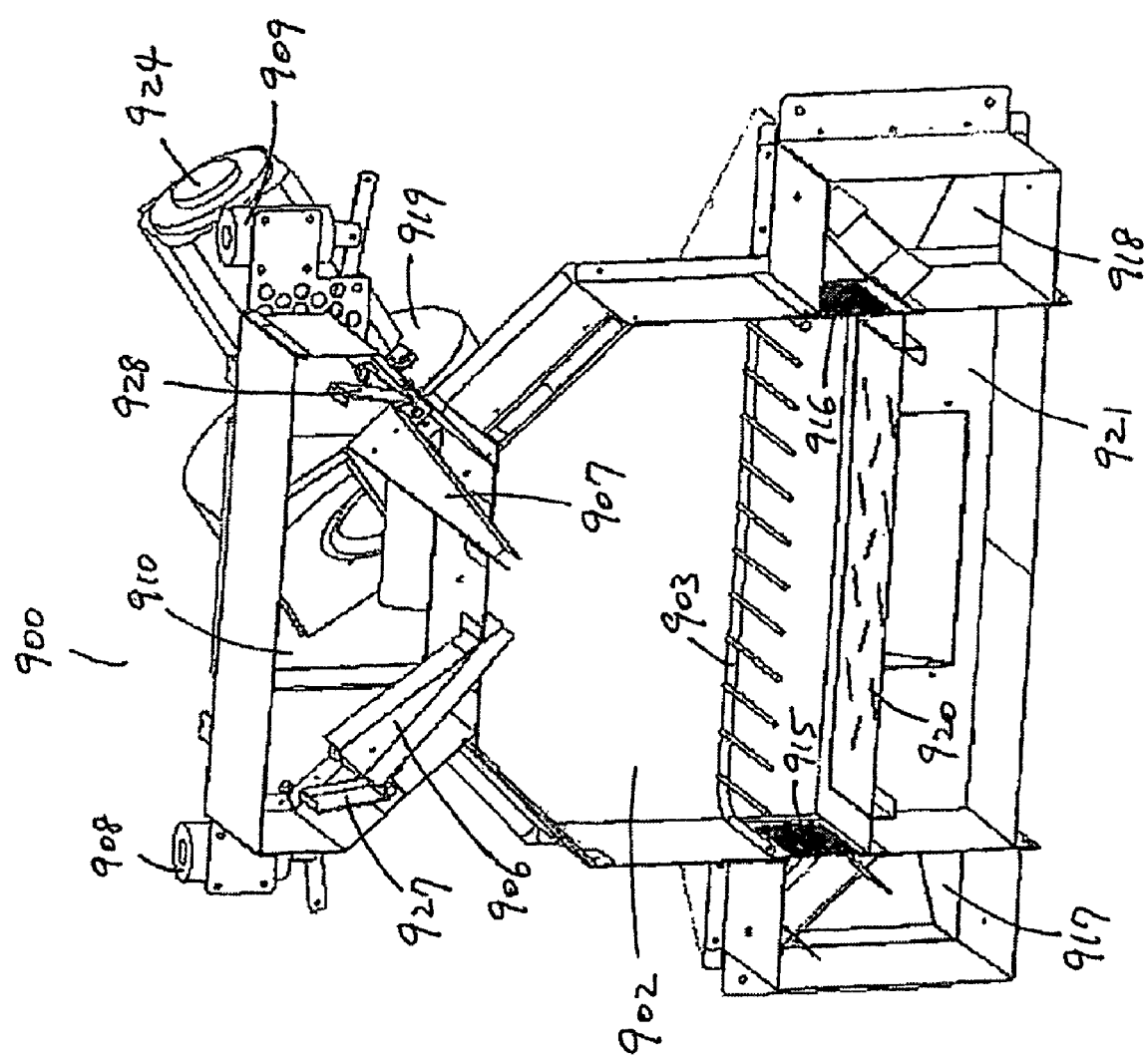
Figure 3C:
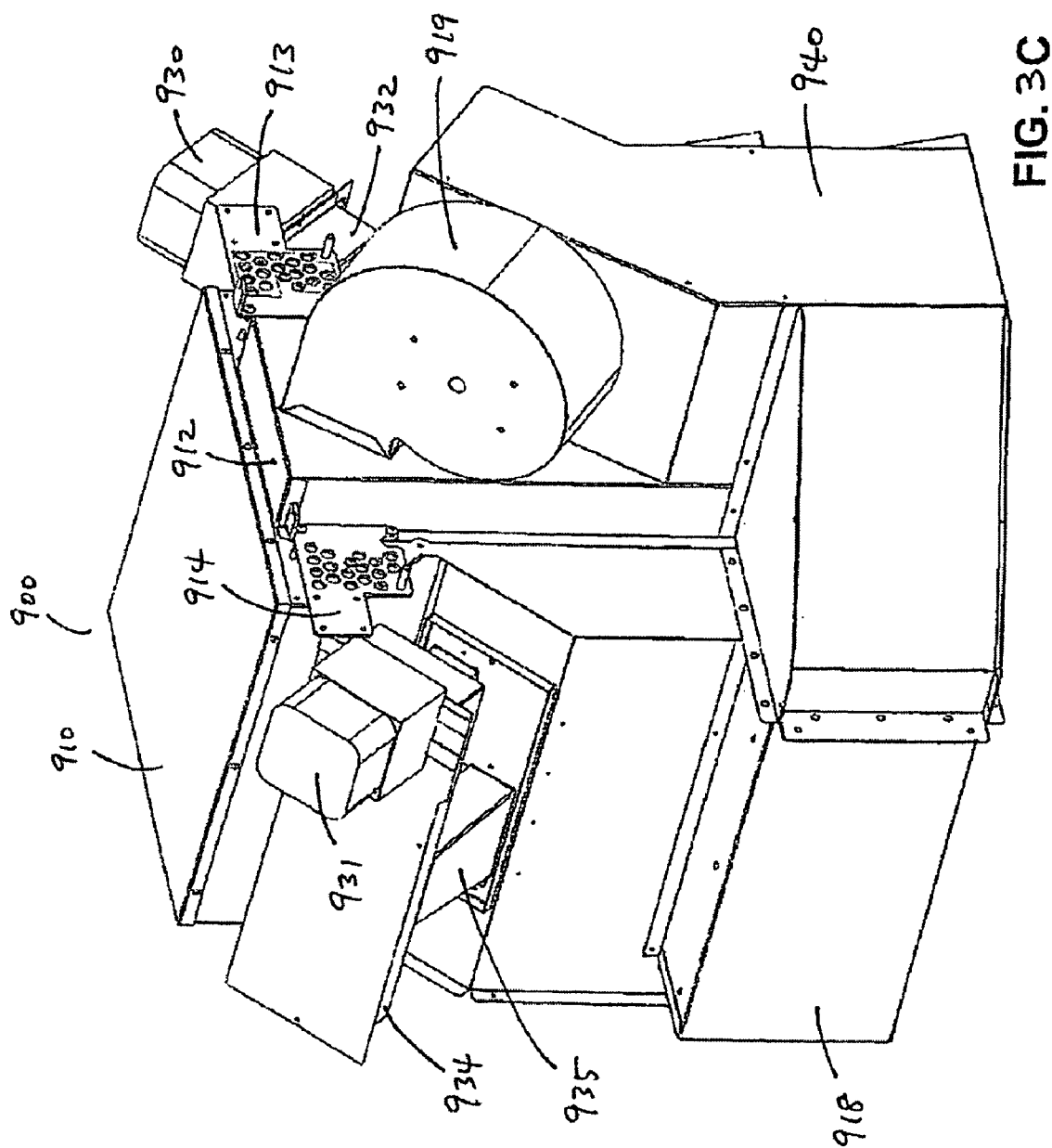
Figure 4A:
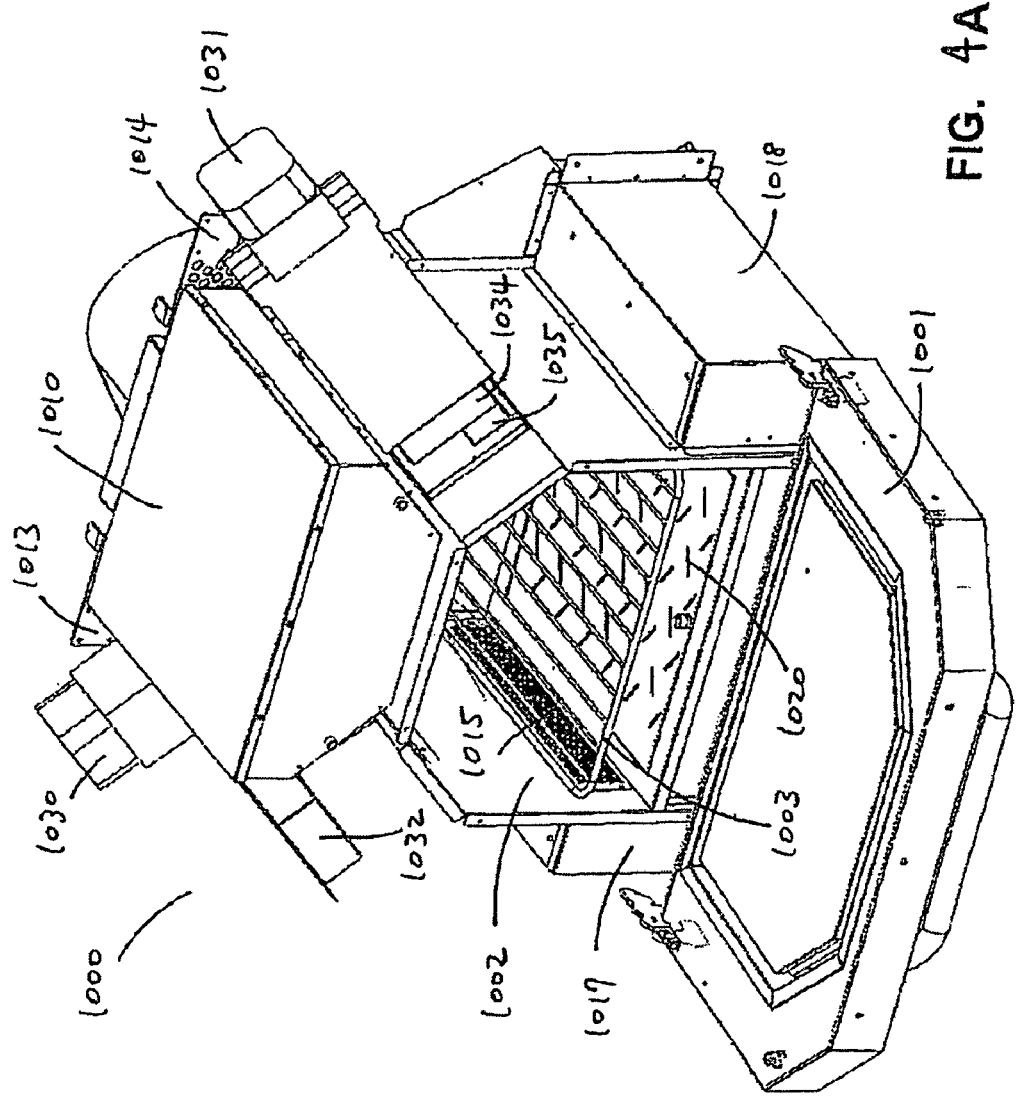
FIGS. 4A, 4B, and 4C illustrate various views of another embodiment of the present invention.
Figure 4B:
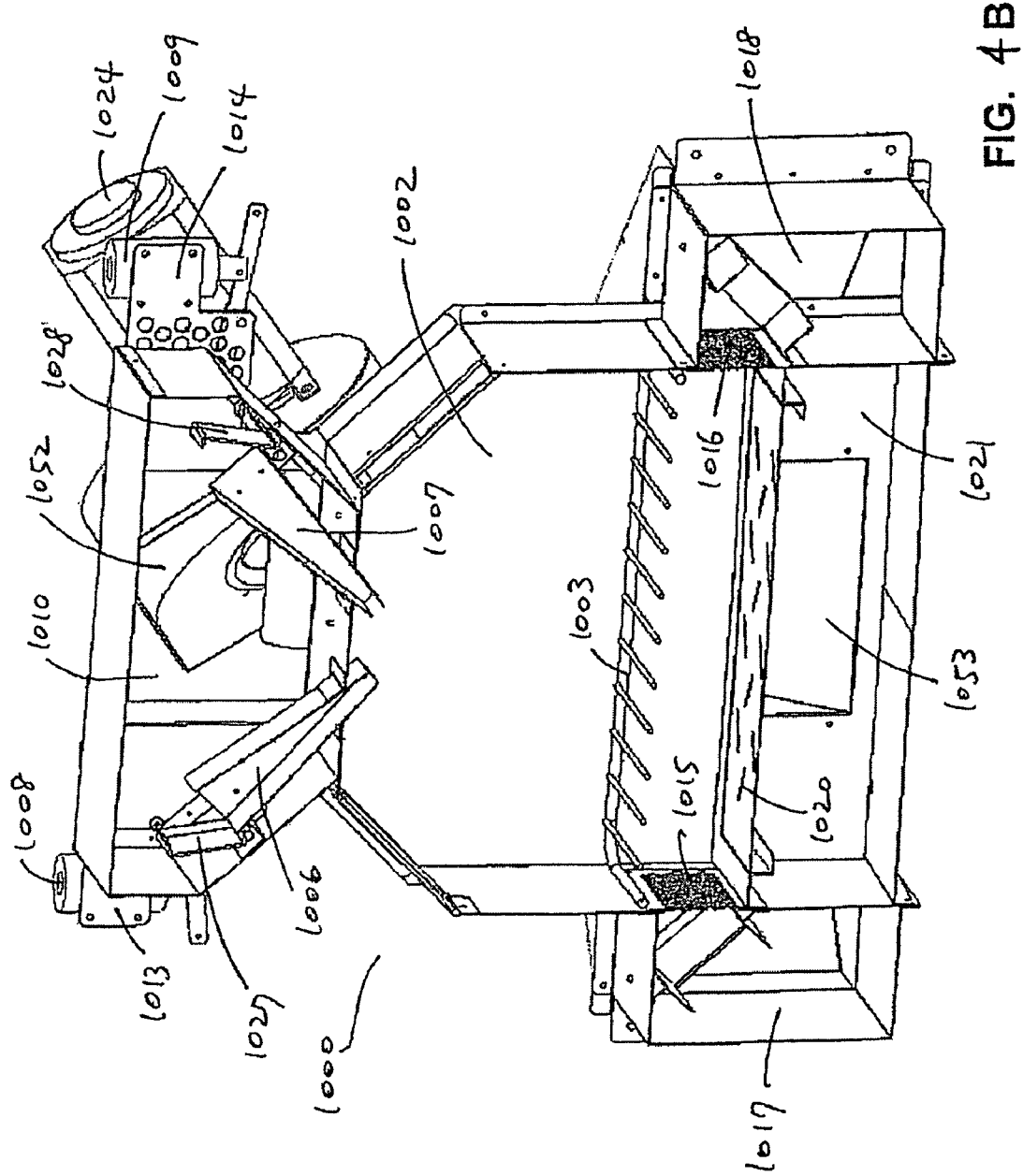
Figure 4C:
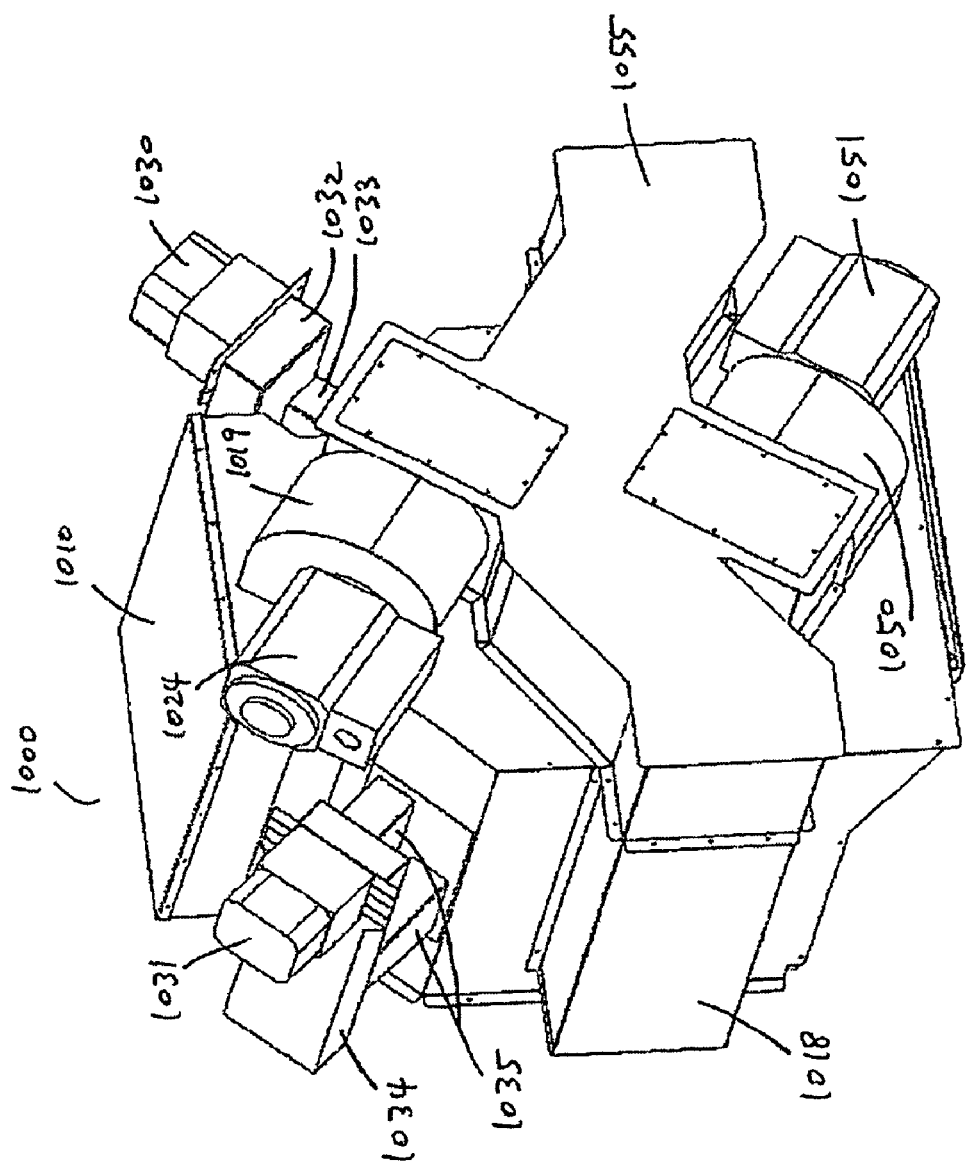

The present invention accommodates heating apparatus of various sizes and capacities. FIGS. 2A, 2B, and 2C illustrate various partial views of an exemplary small version of a heating apparatus that uses hot air impingement (at least in part); FIGS. 3A, 3B, and 3C illustrate various partial views of an exemplary medium version; and FIGS. 4A, 4B, and 4C illustrate various partial views of an exemplary large version. These figures are merely schematic illustrations based on various partial views and are not intended to be complete or reflect the exact dimensions, scales or relative proportions of the apparatus or components thereof, or the full engineering specification thereof, which should be apparent to those skilled in the art. Furthermore, while these figures show various internal components of the apparatus as being exposed to the outside for illustrative purposes, the commercial versions of these apparatus would most likely have a housing to encase these components for safety, aesthetic and other reasons. In addition, although these exemplary embodiments of the present invention are shown to use two tubes of the type shown in FIGS. 1B, 1C, and 1D to provide hot air impingement, it should be appreciated that various other alternatives may be used in their place to provide hot air impingement.

Referring now to FIGS. 2A, 2B, and 2C, therein illustrated is an exemplary small version of a heating apparatus 800. FIG. 2A is a frontal perspective view of the heating apparatus 800 with its door 801 open; FIG. 2B is a partial frontal cross-sectional view of the heating apparatus 800 of FIG. 2A; and FIG. 2C is a perspective view of the heating apparatus 800 from the left rear. The heating apparatus 800 comprises a chamber 802, which is adapted to receive an object on a support 803 for heating. The exemplary external dimension of the heating apparatus 800 is 14 inches wide, 28 inches deep, and 22 inches tall, and the exemplary dimension of the chamber 802 is 9.6 inches wide, 12 inches deep, and 9.6 inches tall.

As means for providing hot air impingement from the top of the chamber 802, the heating apparatus 800 has two tubes 806 and 807 for generating plume arrays of heated gas and introducing them into the chamber 802. These tubes 806 and 807 may be positioned on the top of the chamber as shown in FIG. 2B. Each of the tubes 806 and 807 comprises a tube inlet coupled to an air inlet housing and a tube outlet coupled to the chamber 802. The tubes 806 and 807 may be of the type and configuration shown in FIGS. 1B, 1C, and 1D, and may further comprise a flap for each tube as shown in FIGS. 1B, 1C, and 1D for covering and opening the tube inlet to control the heated air flow through the tube 806, 807. Solenoids 808 and 809 may be used to drive the flaps to open and close. As noted above, brackets 813 and 814 may be used to hold the solenoids 808 and 809 respectively so that the heat transfer from the plenum of the heating apparatus to the solenoids can be minimized.

In this exemplary embodiment, the tube inlets for the two tubes 806 and 807 are respectively encased in separate air inlet housings 810 and 811, which are connected through an air conduit 812. The tubes 806 and 807 are configured to respectively direct their plume arrays toward substantially opposite portions of the support 803 at a non-zero angle less than 90 degrees with respect to the surface of the support. In this configuration, the directions of the plume arrays from the tubes 806 and 807 cross each other above the object placed on the support 803.

The heating apparatus 800 further comprises return openings 815 and 816 on both side walls of the chamber 802. The return opening 815 is preferably positioned substantially at or along the intersection of the direction of the plume array generated by the tube 807 and the side wall of the chamber 802. Likewise, the return opening 816 is preferably positioned substantially at or along the intersection of the direction of the plume array generated by the tube 806 and the side wall of the chamber 802. The return openings 815 and 816 allow the gas from the plume arrays generated by the tubes 807 and 806 to return from the chamber 802 to the air conduit 812 via return air plenums 817 and 818 and one or more intermediate conduits, respectively.

The air conduit 812 allows gaseous communication from other parts of the heating apparatus to the two air inlet housings 810 and 811. While not shown in the figures, a thermal energy source, such as parallel heating coils, may be coupled to or disposed in the air conduit 812 to heat the air disposed therein. The heating apparatus 800 has a hot air blower 819, which serves to circulate the air between the chamber 802, the return air plenums 817 and 818, the air conduit 812, and the air inlet housings 810 and 811. A blower motor 824, which may be a single speed or variable speed motor, drives hot air blower 819.

The heating apparatus 800 also has bottom air inlets 820 which are positioned below the support 803 substantially at the bottom of the chamber 802 to direct a hot air flow to the underside of the support 803. This hot air to the bottom air inlets 820 is supplied by a bottom air inlet plenum 821, which is connected to, and diverts the heated gas from, the air conduit 812. In this heating apparatus 800, the hot air blower 819 serves to circulate the heated gas not only to the air inlet housings 810 and 811 on the top of the chamber 802, but also to the bottom air inlet plenum 821 below the bottom of the chamber.

Referring now to FIGS. 3A, 3B, and 3C, therein illustrated is an exemplary medium version of a heating apparatus 900. FIG. 3A is a frontal perspective view of the heating apparatus 900; FIG. 3B is a partial frontal cross-sectional view of the heating apparatus 900 of FIG. 3A; and FIG. 3C is a perspective view of the heating apparatus 900 from the right rear. The heating apparatus 900 comprises a chamber 902, which is adapted to receive an object on a support 903 for heating. The exemplary external dimension of the heating apparatus 900 is 28 inches wide, 27 inches deep, and 24 inches tall, and the exemplary dimension of the chamber 902 is 14.4 inches wide, 14.4 inches deep, and 10.2 inches tall.

As means for providing hot air impingement from the top of the chamber, the heating apparatus 900 has two tubes 906 and 907 for generating plume arrays of heated gas and introducing them into the chamber 902. These tubes 906 and 907 may be positioned on the top of the chamber as shown in FIG. 3B. Each of the tubes 906 and 907 comprises a tube inlet coupled to an air inlet housing 910 and a tube outlet coupled to the chamber 902. The tubes 906 and 907 may be of the type and configuration shown in FIGS. 1B, 1C, and 1D, and may further respectively comprise flaps 927 and 928 for covering and opening the tube inlet to control the heated air flow through the tubes 906 and 907. Solenoids 908 and 909 may be used to respectively drive the flaps 927 and 928 to open and close. As noted above, brackets 913 and 914 may be used to hold the solenoids 908 and 909 respectively so that the heat transfer from the plenum of the heating apparatus to the solenoids can be minimized.

In this exemplary embodiment, the tube inlets for the two tubes 906 and 907 are both encased in a single air inlet housing 910. The tubes 906 and 907 are configured to respectively direct their plume arrays toward substantially opposite portions of the support 903 at a non-zero angle less than 90 degrees with respect to the surface of the support. In this configuration, the directions of the plume arrays from the tubes 906 and 907 cross each other above the object placed on the support 903.

The heating apparatus 900 further comprises return openings 915 and 916 on both side walls of the chamber 902. The return opening 915 is preferably positioned substantially at or along the intersection of the direction of the plume array generated by the tube 907 and the side wall of the chamber 902. Likewise, the return opening 916 is preferably positioned substantially at or along the intersection of the direction of the plume array generated by the tube 906 and the side wall of the chamber 902. The return openings 915 and 916 allow the gas from the plume arrays generated by the tubes 907 and 906 to return from the chamber 902 to an air conduit 940 via return air plenums 917 and 918, respectively.

While not shown in the figures, a thermal energy source, such as parallel heating coils, may be coupled to or disposed in the air conduit 940 to heat the air disposed therein. The heating apparatus 900 has a hot air blower 919, which serves to circulate the air between the chamber 902, the return air plenums 917 and 918, the air conduit 940, and the air inlet housing 910. A blower motor 924 (not shown in FIG. 3C), which may be a single speed or variable speed motor, drives hot air blower 919.

The heating apparatus 900 also has bottom air inlets 920 which are positioned below the support 903 substantially at the bottom of the chamber 902 to direct a hot air flow to the underside of the support 903. The hot air to the bottom air inlets 920 is supplied by a bottom air inlet plenum 921. In this heating apparatus 900, the hot air blower 919 serves to circulate the heated gas not only to the air inlet housing 910 on the top of the chamber 902, but also to the bottom air inlet plenum 921 below the bottom of the chamber. A portion of the heated air from the hot air blower 919 is diverted to the bottom air inlet plenum 921 via a bottom air conduit 912.

Referring now to FIGS. 4A, 4B, and 4C, therein illustrated is an exemplary large version of a heating apparatus 1000. FIG. 4A is a frontal perspective view of the heating apparatus 1000 with its door 1001 open; FIG. 4B is a partial frontal cross-sectional view of the heating apparatus 1000 of FIG. 4A; and FIG. 4C is a perspective view of the heating apparatus 1000 from the right rear. The heating apparatus 1000 comprises a chamber 1002, which is adapted to receive an object on a support 1003 for heating. This exemplary large version may accommodate the support 1003 in the form of an elevator or an additional elevating mechanism for the support 1003 so that the height of the support 1003 may be dynamically adjusted during the operation of the heating apparatus 1000. The exemplary external dimension of the heating apparatus 1000 is 30 inches wide, 26 inches deep, and 23 inches tall, and the exemplary dimension of the chamber 1002 is 16.8 inches wide, 16.8 inches deep, and 12.6 inches tall.

As means for providing hot air impingement from the top of the chamber, the heating apparatus 1000 has two tubes 1006 and 1007 for generating plume arrays of heated gas and introducing them into the chamber 1002. These tubes 1006 and 1007 may be positioned on the top of the chamber as shown in FIG. 4B. Each of the tubes 1006 and 1007 comprises a tube inlet coupled to an air inlet housing 1010 and a tube outlet coupled to the chamber 1002. The tubes 1006 and 1007 may be of the type and configuration shown in FIGS. 1B, 1C, and 1D, and may further respectively comprise flaps 1027 and 1028 for respectively covering and opening the tube inlets of the tubes 1006 and 1007 to control the heated air flow through the tubes. Solenoids 1008 and 1009 may be used to respectively drive the flaps 1027 and 1028 to open and close the air inlets to the tubes 1006 and 1007. As noted above, brackets 1013 and 1014 may be used to respectively hold the solenoids 1008 and 1009 so that the heat transfer from the plenum of the heating apparatus to the solenoids can be minimized.

In this exemplary embodiment, the tube inlets for the two tubes 1006 and 1007 are both encased in a single air inlet housing 1010. The tubes 1006 and 1007 are configured to respectively direct their plume arrays toward substantially opposite portions of the support 1003 at a non-zero angle less than 90 degrees with respect to the surface of the support. In this configuration, the directions of the plume arrays from the tubes 1006 and 1007 cross each other above the object placed on the support 1003.

The heating apparatus 1000 further comprises return openings 1015 and 1016 on both side walls of the chamber 1002. The return opening 1015 is preferably positioned substantially at or along the intersection of the direction of the plume array generated by the tube 1007 and the side wall of the chamber 1002. Likewise, the return opening 1016 is preferably positioned substantially at or along the intersection of the direction of the plume array generated by the tube 1006 and the side wall of the chamber 1002. The return openings 1015 and 1016 allow the gas from the plume arrays generated by the tubes 1007 and 1006 to return from the chamber 1002 to an air conduit 1055 via return air plenums 1017 and 1018, respectively.

While not shown in the figures, a thermal energy source, such as parallel heating coils, may be coupled to or disposed in the air conduit 1055 to heat the air disposed therein.

The heating apparatus 1000 also has bottom air inlets 1020 which are positioned below the support 1003 substantially at the bottom of the chamber 1002 to direct a hot air flow to the underside of the support 1003. The hot air flowing through the bottom air inlets 1020 is supplied by a bottom air inlet plenum 1021. As shown in FIG. 4C, the heating apparatus 1000 has two independently controllable hot air blowers 1019 and 1050. The top blower 1019, driven by a top blower motor 1024, serves to direct the heated gas in the air conduit 1055 to the air inlet housing 1010 through a top blower outlet 1052. Meanwhile, the bottom blower 1050, driven by a bottom blower motor 1051, serves to divert a portion of the heated gas disposed in the air conduit 1055 to the bottom air inlet plenum 1021 through a bottom blower outlet 1053. Each of the blower motors 1024, 1051 may be a single speed or variable speed.

One common feature shared by the various exemplary embodiments of the present invention illustrated in FIGS. 2-4 and described above is the two-tube arrangement for hot air impingement positioned at the top of a chamber. The two tubes are configured to respectively direct plume arrays or planar plumes of heated air towards substantially opposite portions of the support for an object, with the directions of the plume arrays from the two tubes crossing above the object. This feature is further illustrated in FIGS. 5A-5C.

Figure 5A:
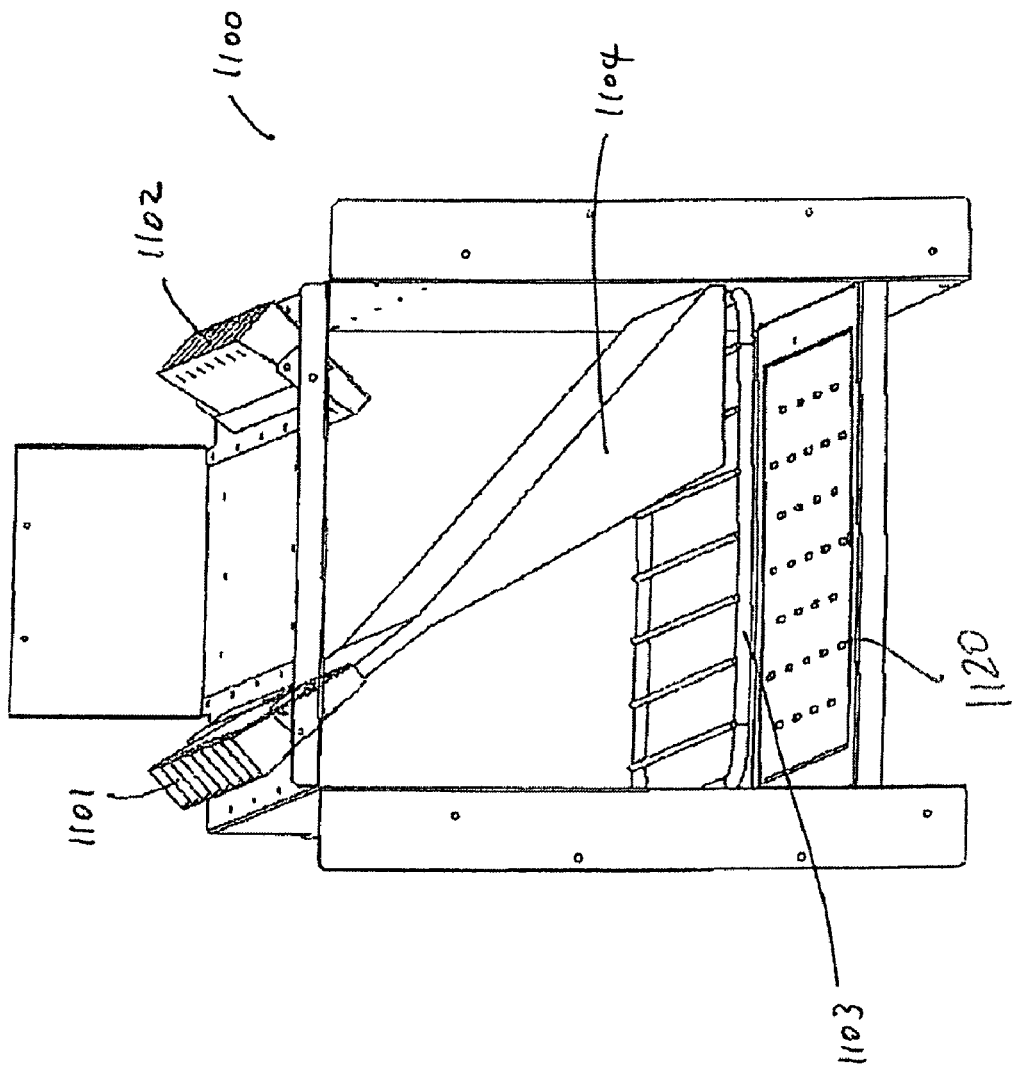

In FIG. 5A, the left tube 1101 on the top of the chamber generates a plume array 1104 of heated air and directs it toward the right portion of a support 1103 of a heating apparatus 1100. Although the plume array 1104 spreads out as it travels through the chamber, the tube 1101 is configured and designed in such a way that the impact of the plume array 1104 is focused substantially on the right portion of the support 1103. Likewise, in FIG. 5B, the right tube 1102 on the top of the chamber generates a plume array 1105 of heated air and directs it toward the left portion of the support 1103. The tube 1102 is also configured and designed in such a way that the impact of the plume array 1105 is focused substantially on the left portion of the support 1103. When both of the tubes 1101 and 1102 are open and direct their respective plume arrays into the chamber, their respective plume arrays collide above the support 1103, and the net result is that the impact of the sum of these plume arrays 1106 is focused substantially on the center of the support 1103, as shown in FIG. 5C.

The above-described capability of the tubes 1101 and 1102 to focus the impact of one or more plume arrays substantially on a selected portion of the support 1103 not only provides the new degree of flexibility, but also optimizes the utilization of the given amount of heated air in heating an object. For example, if the surface area of an object placed on the center of the support 1103 is substantially smaller than the surface area of the support (e.g., a 6-inch object placed on a 14.4 inch by 14.4 inch support), then one can maximize the contact between the heated air and the object on the support by focusing the heated air in the form of plume arrays substantially on the center of the support, as shown in FIG. 5C. In this way, one can optimize the utilization of the heated air in heating the object, while minimizing the application of the heated air to the area of the support where the heated air is not needed (i.e., where the object is not present).

In comparison, prior art hot air impingement techniques use columns of heated air, which are designed to strike an object at an angle substantially perpendicular to the surface of the object. By its design, an apparatus that uses these prior art techniques applies the columns of heated air over the entire surface of the support, without the capability of focusing the heated air on a selected portion of the support. Hence, compared to the present invention, the conventional heating apparatus is not only much less flexible, but also much less efficient in utilizing the given amount of heated air in heating an object, as much of the impinging air does not contact the object.

Figure 5B:
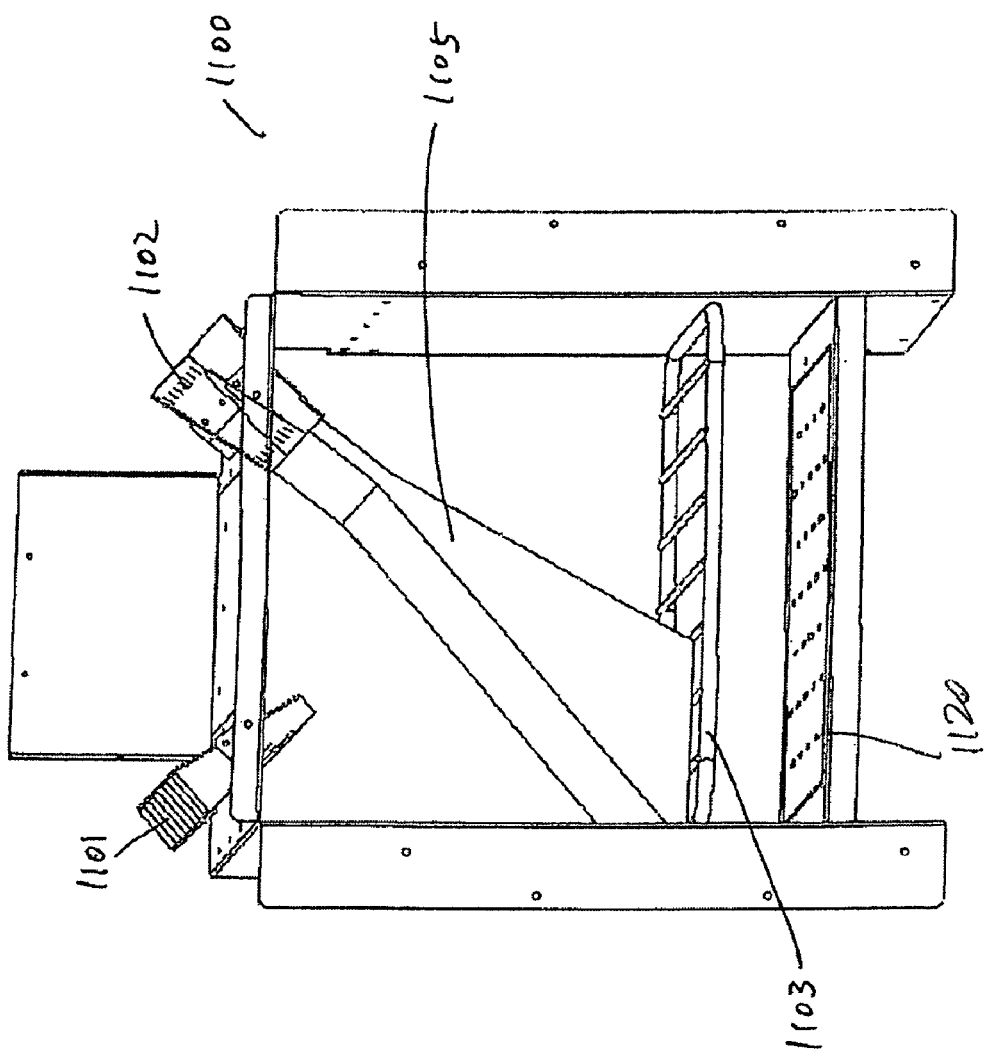

Even for an object with a relatively large surface area, the two-tube arrangement shown in FIGS. 5A, 5B and 5C is much more efficient in utilizing the heated air than the conventional heating apparatus. Because the direction of the plume array of heated air from the tube 1101, 1102 is at a non-zero angle less than 90 degrees with respect to the surface of the support 1103, the heated air is drawn laterally across the surface of the object after the impact and moves toward the side edges of the support 1103. This lateral drawing of the heated air across the food surface facilitates the heat transfer from the heated air to the object. As discussed above, by positioning a return opening at or along the intersection of the direction of the plume array from the tube 1101, 1102 and the side wall of the chamber, one may further enhance the effect of drawing the heated air laterally across the food surface, thereby optimizing the heating efficiency.

In accordance with an additional aspect of the present invention, the various exemplary embodiments of the present invention illustrated in FIGS. 2-5 and described above can utilize an arrangement for hot air impingement having at least two tubes positioned at the bottom of a chamber, in place of bottom air inlets 820, 920, 1020, and 1120. The at least two tubes are configured to respectively direct plume arrays or planar plumes of heated air towards substantially opposite portions of the support for an object from the bottom of the chamber. In accordance with a further additional aspect of the present invention, a third tube can be located between the first and second tubes to direct a plume array or a planar plume of heated air toward the support perpendicular to the surface of the support. These features are further illustrated in FIGS. 6A-6C, 7A-7B, and 8A-8B.

FIGS. 6A, 6B, and 6C respectively illustrate a perspective view, a front plan view, and a top plan view of a bottom plate 1200 that can be used in place of the bottom air inlets 820, 920, 1020, and 1120 that are respectively shown in the exemplary embodiments of the present invention that are illustrated in FIGS. 2-5. Bottom plate 1200 includes at least two tubes, a right tube 1201 and a left tube 1202. Bottom plate 1200 is preferably made of stainless steel, but can be made of any material that is suitable for use in a heating apparatus.

Tubes 1201, 1202 may be of the type and configuration shown in FIGS. 1B, 1C, and 1D. The factors that one of ordinary skill in the art would need to consider to determine the dimensions of right tube 1201 and left tube 1202 include the amount of space between (1) the top of the tube and the bottom of the support for the object (e.g., support 803, support 903, support 1003, or support 1103, respectively shown in FIGS. 2-5) above it, and (2) the bottom of the tube and the bottom of the air inlet plenum (e.g., bottom air inlet plenum 821, bottom air inlet plenum 921, or bottom air inlet plenum 1021, respectively shown in FIGS. 2-4) below it. In a preferred embodiment of the small version of heating apparatus 800 shown in FIGS. 2A, 2B, and 2C, right tube 1201 and left tube 1202 have a length of approximately 9 inches, a width of approximately 0.125 inches, and a height of approximately 1.1 inches. In a preferred embodiment of the medium version of heating apparatus 900 shown in FIGS. 3A, 3B, and 3C, right tube 1201 and left tube 1202 have a length of approximately 11 inches, a width of approximately 0.125 inches, and a height of approximately 1.1 inches. In a preferred embodiment of the large version of heating apparatus 1000 shown in FIGS. 4A, 4B, and 4C, right tube 1201 and left tube 1202 have a length of approximately 14 inches, a width of approximately 0.125 inches, and a height of approximately 1.1 inches.

In a preferred embodiment of the present invention, bottom plate 1200 also includes a middle tube 1203, which is located between right tube 1201 and left tube 1202. Like right and left tubes 1201, 1202, middle tube 1203 may be of the type and configuration shown in FIGS. 1B, 1C, and 1D. One of ordinary skill in the art would consider the same factors mentioned above with respect to tubes 1201, 1202 to determine the dimensions of right tube 1201 and left tube 1202. Middle tube 1203 has a length of approximately 9 inches and a width of approximately 0.08 inches. However, in accordance with an aspect of the present invention, the height of middle tube 1203 may be smaller than the heights of right tube 1201 and left tube 1202. In a preferred embodiment of the present invention, the height of middle tube 1203 is approximately 0.975 inches.

In the preferred embodiment shown in FIGS. 6A-6C, right tube 1201 and left tube 1202 are contiguous with middle tube 1203. In alternative embodiments that are not shown in any drawing, right tube 1201 and left tube 1202 may be separated from middle tube 1203 while still achieving the desired effect of the present invention. In one such embodiment, right tube 1201 and left tube 1202 are each separated from middle tube 1203 by approximately two inches.

In a preferred embodiment, bottom plate 1200 further includes at least one screw 1204, which is used to secure bottom plate 1200 to the bottom of the chamber. The use of screw 1204 is particularly advantageous because it allows for the rapid and easy removal of bottom plate 1200 from the chamber so that bottom plate 1200 can be cleaned, for example in a dishwasher. Those of ordinary skill in the art will readily recognize that various conventional means other than screw 1204 are available to removably secure bottom plate 1200 to the bottom of the chamber. Such other means will not be described further herein.

Right tube 1201 and left tube 1202 are configured to direct plume arrays or planar plumes of heated air towards substantially opposite portions of the support for an object. In a preferred embodiment, middle tube 1203 is configured to direct plume arrays or planar plumes of heated air toward a center portion of the support for an object. These features are further illustrated in FIGS. 7A and 7B.

Figure 7B:
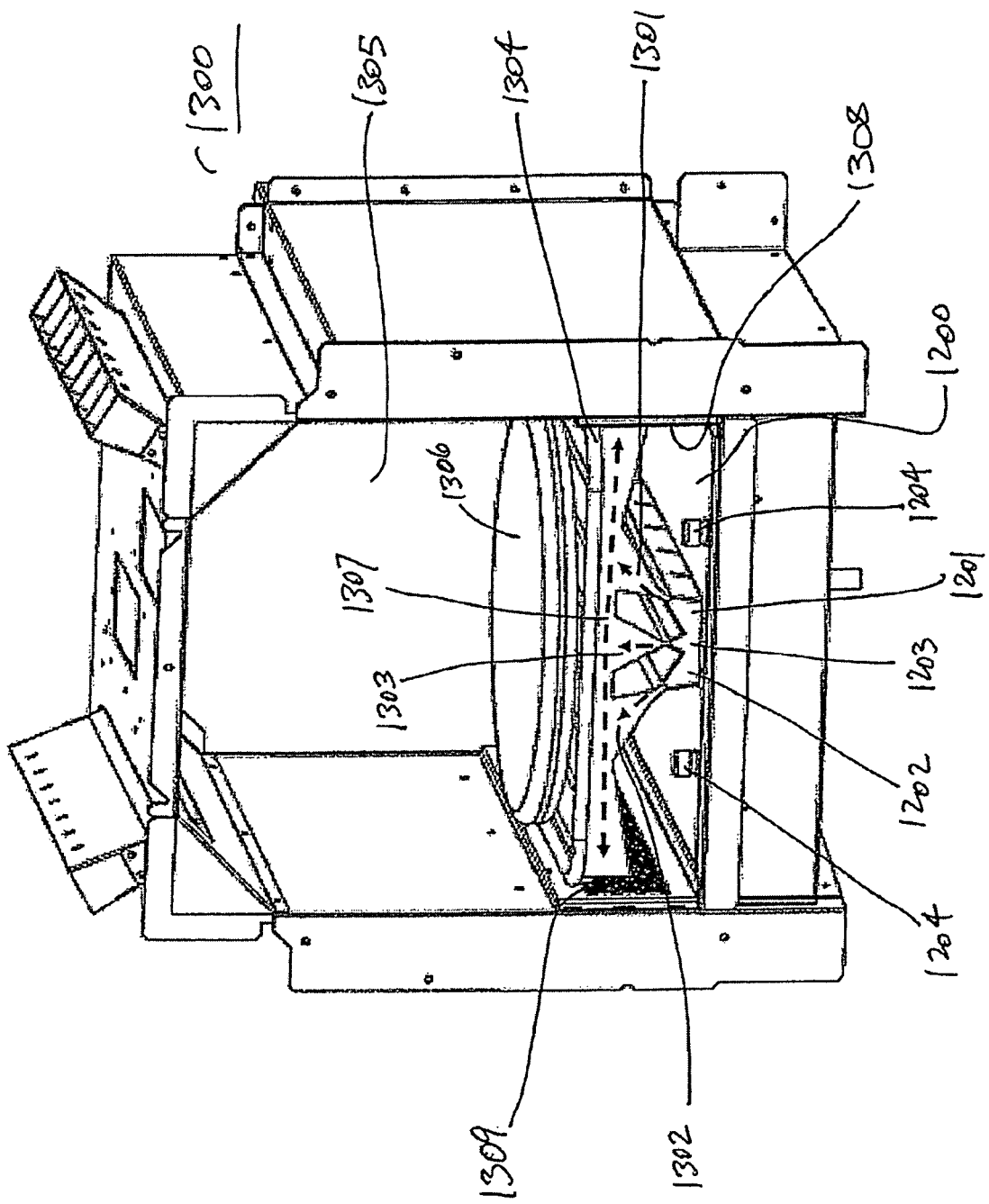

Referring now to FIGS. 7A and 7B, bottom plate 1200 can be used in the exemplary embodiments of the present invention illustrated in FIGS. 2-5 and described above. Right tube 1201 generates a plume array 1301 of heated air and directs it toward the right portion of support 1304 of heating apparatus 1300. Although the plume array 1301 spreads out as it travels toward support 1304, right tube 1201 is configured and designed in such a way that the impact of plume array 1301 is focused substantially on the right portion of support 1304. Likewise, left tube 1202 generates a plume array 1302 of heated air and directs it toward the left portion of support 1304. Left tube 1202 is also configured and designed in such a way that the impact of plume array 1302 is focused substantially on the left portion of support 1304. Furthermore, middle tube 1203 generates a plume array 1303 of heated air and directs it toward the center portion of the support 1304. Middle tube 1203 is also configured and designed in such a way that the impact of the plume array 1303 is focused substantially on the center portion of support 1304. Bottom plate 1200 is secured to the heating apparatus using screws 1204.

When tubes 1201,1202,1203 direct their respective plume arrays 1301,1302,1303 into chamber 1305 as described above, the respective plume arrays 1301,1302,1303 are drawn laterally across the bottom surface of object 1306 sitting on support 1304, rather than simply bouncing off object 1306. The result is a layer 1307 of hot air that completely surrounds the bottom surface of object 1306. This effect is due to the directions of the plume arrays 1301,1302, 1303 and the positions of return openings 1308,1309 in chamber 1305.

Because the directions of plume arrays 1301,1302 of heated air respectively provided from right and left tubes 1201,1202 are at a non-zero angle less than 90 degrees with respect to the surface of the support 1304, the heated air from these tubes will tend to move laterally, toward the side edges of support 1304, after it impacts the bottom surface of object 1306. Furthermore, and very importantly, the negative pressure provided at return openings 1308,1309 further enhances the effect of drawing the plume arrays 1301,1302,1303 laterally across the bottom surface of object 1306, thereby optimizing the heating efficiency. In a preferred embodiment, each of the return openings 1308,1309 are positioned substantially at or along the intersection of the bottom of chamber 1305 and a side wall of the chamber. The lateral drawing of the heated air across the bottom surface of object 1306 to surround it with heated air facilitates heat transfer from the heated air to object 1306.

In comparison, a typical conventional heating apparatus uses columns of heated air, which are designed to strike an object at an angle that is substantially perpendicular to the surface of the object. By its design, the conventional heating apparatus applies columns of heated air to the entire bottom surface of the support. The return path for these columns of heated air in a typical conventional heating apparatus is provided at the back of the heating apparatus. Each column of heated air (to the extent it contacts the bottom surface of the object) is focused on a particular area of the bottom surface of the object. As a result, the spotting problem referred to in the Background section occurs at the bottom surface of the object. Hence, compared to the heating apparatus made in accordance with the present invention, the conventional heating apparatus is much less efficient in utilizing the given amount of heated air in heating an object, as the impinging air does not contact the entire bottom surface of the object.

Figure 8A:
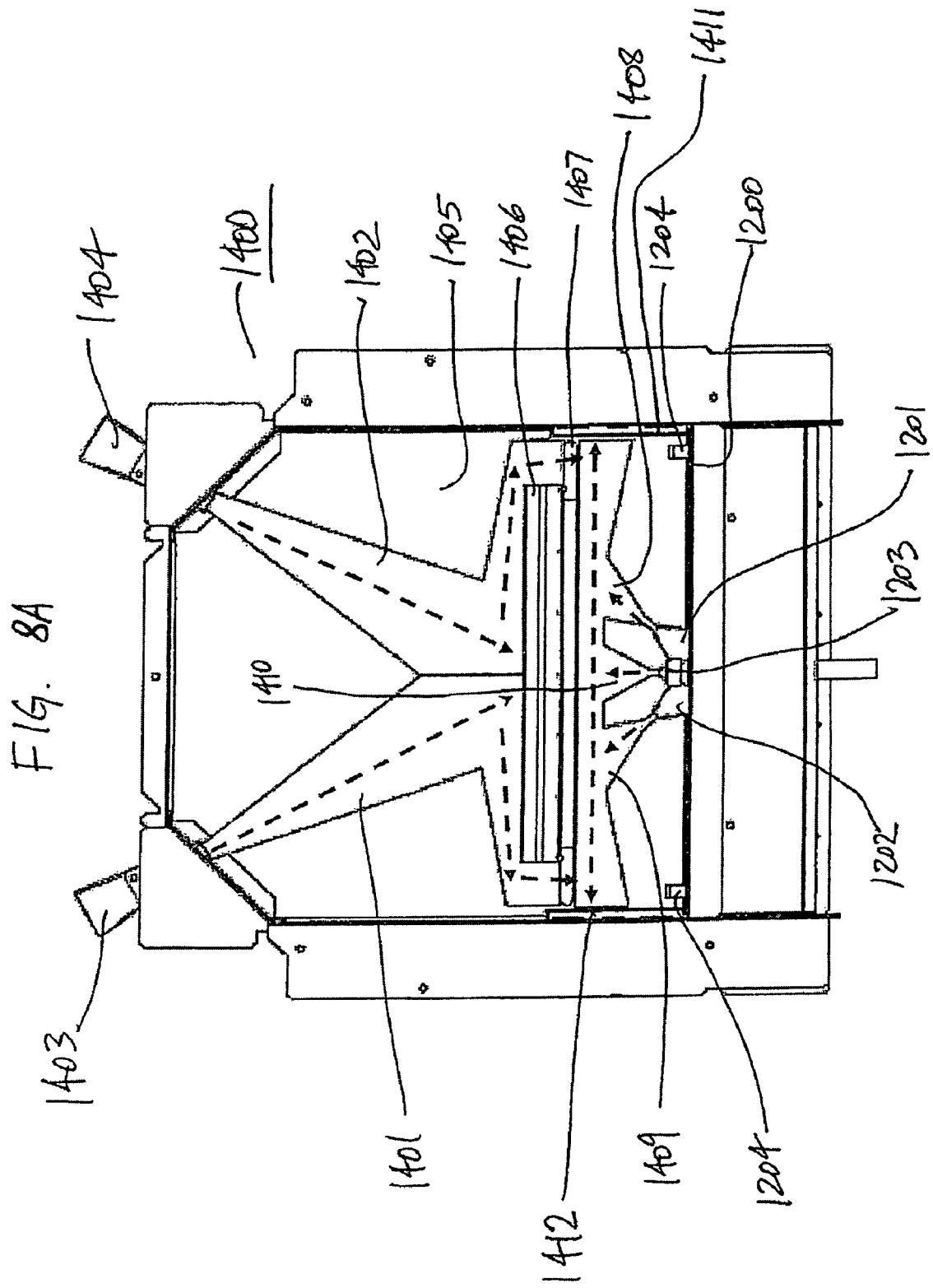
FIGS. 8A and 8B illustrate plume arrays generated in at least one embodiment of the present invention.
Figure 8B:
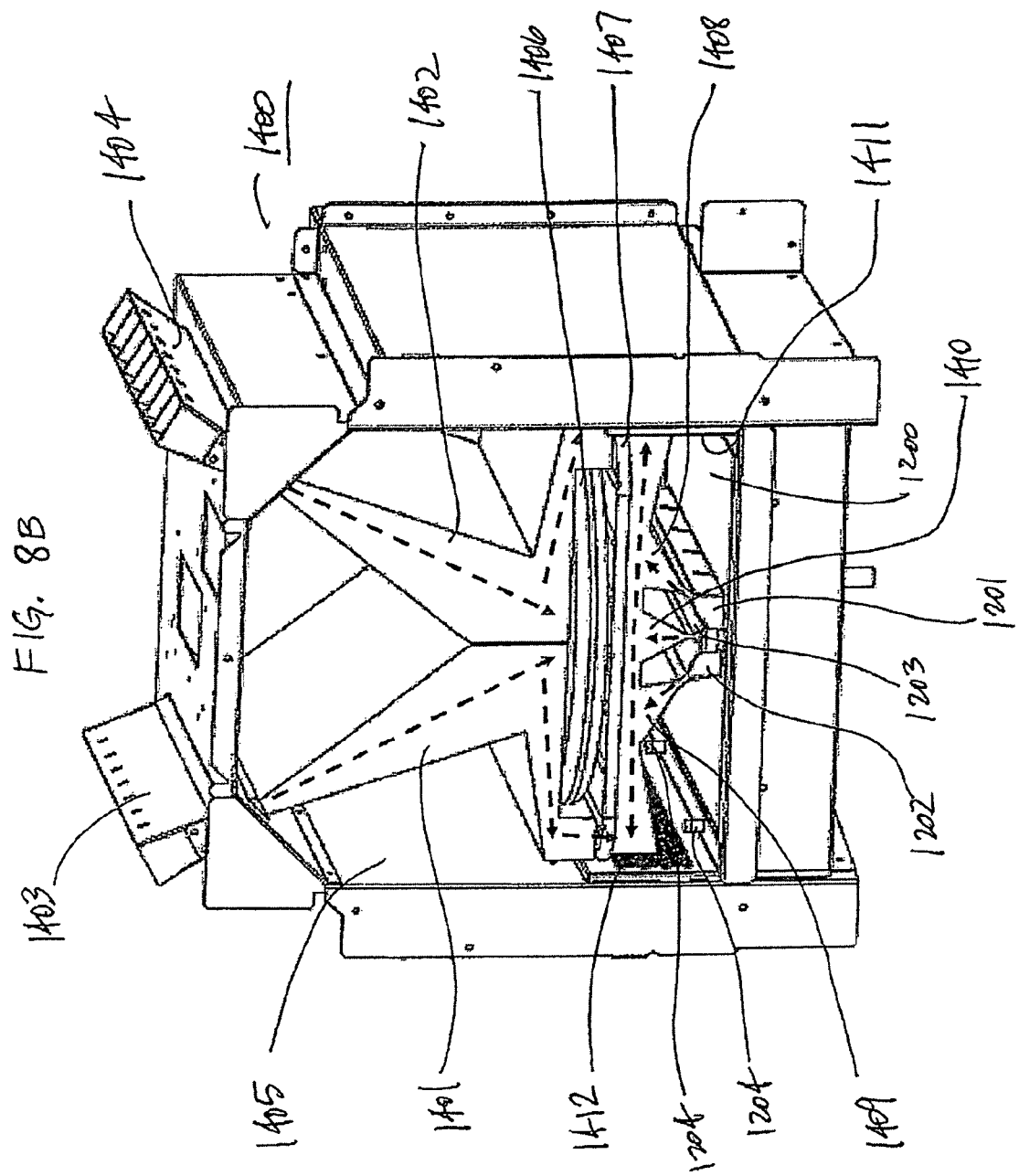

Referring now to FIGS. 8A and 8B, the tubes of bottom plate 1200 can be used in combination with the top tubes used in the exemplary embodiments of the present invention illustrated in FIGS. 2-5 and described above. As shown in FIGS. 8A and 8B, plume arrays 1401,1402 from respective tubes 1403,1404 at the top of chamber 1405 of heating apparatus 1400 can be used to heat the top and side surfaces of an object 1406 sitting on a support 1407, as described earlier herein. At the same time, plume arrays 1408,1409,1410 from respective tubes 1201,1202,1203 of bottom plate 1200 (which is secured to heating apparatus 1400 by screws 1204) can be used to heat the bottom surface of object 1406. As described in connection with FIGS. 7A and 7B, plume arrays 1401,1402 and 1408, 1409,1410 are drawn laterally across the top and bottom surfaces, respectively, of object 1406 by virtue of the positioning of tubes 1201,1202,1203,1403,1404 and the negative pressure at return openings 1411,1412. In this way, the impinging hot air supplied into chamber 1405 by tubes 1201, 1202,1203,1403,1404 surrounds object 1406, thereby improving the heating efficiency of heating apparatus 1400.

In accordance with another aspect of the present invention, the inventors have discovered that the path that the fluid (e.g., a gas, such as air) travels in the chamber in each of the exemplary embodiments shown in FIGS. 2-8 is a critical and previously unappreciated aspect of the efficient transfer of heat from the fluid to the object.

Figure 10A:
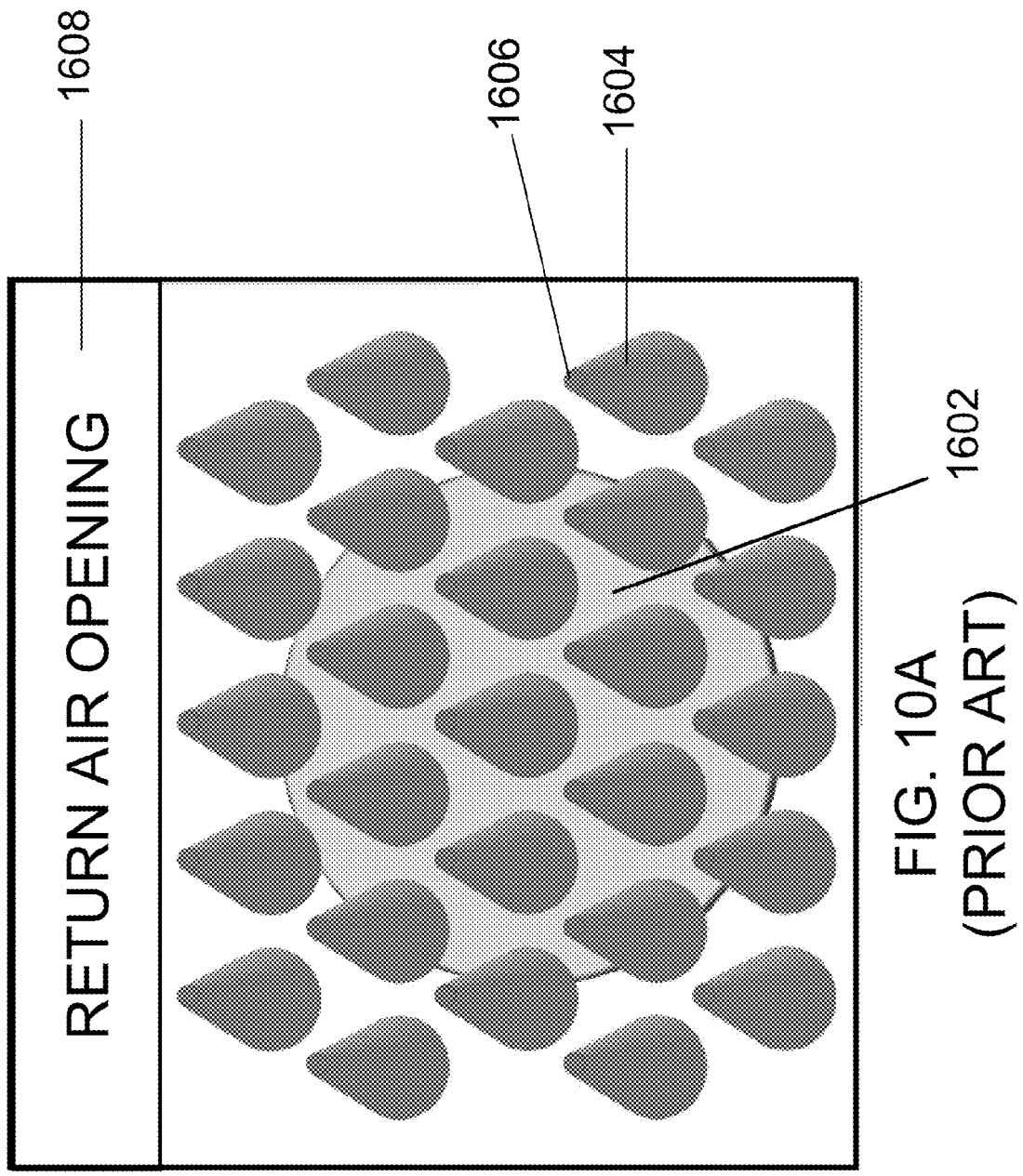
FIGS. 10A and 10B illustrate prior art hot air impingement techniques.

As discussed in the Background section and illustrated in FIG. 10A, prior art techniques for transferring heat to object 1602 introduce columns 1604 of hot air from hot air jet holes 1606 that are disposed in an upper wall of the chamber (not shown), above object 1602. The columns 1604 are formed by moving the hot air through the holes 1606 at high velocity. These prior art embodiments also typically include a return opening 1608 that is located in the back wall of the chamber.

Figure 10B:
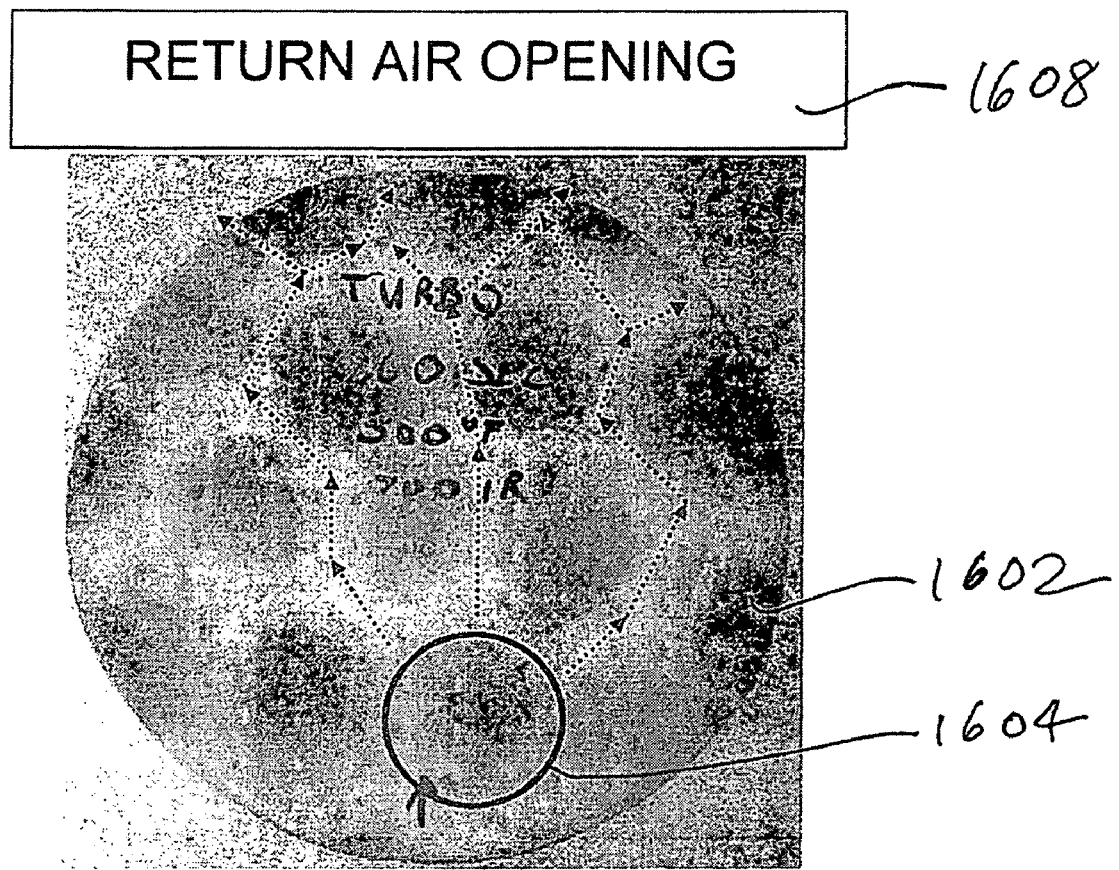

The hot air jet holes 1606 are separated from each other by a distance that is sufficient to allow the air that rebounds off of object 1602 to form various paths to return opening 1608. As discussed in the Background section and illustrated in FIGS. 10A and 10B, the rebounded air from each column 1604 travels different paths to return opening 1608. Consequently, more force is required to return the air to the blower (not shown). In addition to traveling different paths, the rebounded air from each column 1604 of hot air travels, for the most part, different distances to return opening 1608 after it strikes object 1602. Accordingly, the portion of object 1602 near the return opening 1608 comes in contact with more return air than do the portions of object 1602 that are farther away from return opening 1608.

In accordance with an aspect of the present invention, a path for fluid flow (e.g., air flow) is provided that solves the aforementioned problems with the prior art. Referring again to FIGS. 8A and 8B, the tubes 1403, 1404 are configured to respectively direct plume arrays or planar plumes 1401, 1402 of heated air towards substantially opposite portions of the support 1407 for object 1406, with the directions of the plume arrays 1401, 1402 from the two tubes 1403, 1404 crossing above the object 1406. In addition, the negative pressure return openings 1411,1412 are positioned substantially at or along the intersection of the bottom of chamber 1405 and a side wall of the chamber. Thus, after striking object 1406, the plume arrays 1401, 1402 of heated air from tubes 1403,1404 move laterally to the return openings 1411,1412.

As shown in FIGS. 8A and 8B, the path of plume arrays 1401, 1402 of hot air provides a significant improvement over the prior art. For purposes of explanation, this description focuses on the left side of heating apparatus 1400 shown in FIG. 8B, and in particular on plume array 1401, tube 1403, and return opening 1412. One of ordinary skill in the art will understand that the same explanation applies to tube 1404 and return opening 1411 on the right side of heating apparatus 1400, and to tubes 1202,1203,1204 at the bottom of chamber 1405.

Plume array 1401 follows an air path in which the hot air remains in substantially the same plane throughout its journey from tube 1403 to return opening 1412. Plume array 1401 can be thought of as comprising an infinite number of planes of hot air. Each plane is parallel to the front or back wall of chamber 1405, and is thus parallel to every other plane. It should be apparent that the hot air in each plane stays within its plane as it is introduced into chamber 1405, strikes object 1406, and then enters return opening 1412. In other words, hot air that enters chamber 1405 from tube 1403 remains in the same top-to-bottom plane in chamber 1405 until it reaches return opening 1412. As stated above, the hot air that enters chamber 1405 from each of tubes 1404,1202, 1203,1204 likewise remains in the same respective top-to-bottom plane in chamber 1405 until it reaches return opening 1412. This feature is also illustrated in FIG. 9.

Consequently, plume arrays 1401,1402,1408,1409,1410 have an unobstructed path as they flow from their respective tubes 1403,1404,1201,1202,1203, strike object 1406, and flow toward return openings 1411,1412. All of the air in each of plume arrays 1401,1402,1408,1409,1410 also travels the same distance toward return openings 1411,1412 as a result of the lack of obstructions present in the air paths. As a result, all of the hot air in a plume array 1401,1402,1408,1409,1410 travels substantially the same distance from its tube 1403, 1404,1201,1202,1203 to a corresponding return opening 1411,1412.

In addition, the air path provided in accordance with the embodiments of the present invention also results in all portions of the surface of object 1406 being in contact with the same volume of hot air. As shown in FIG. 9, the portion of the surface of object 1406 designated "A," which is close to the center of object 1406, is exposed to the same volume of hot air as the portion of the surface of object 1406 designated "B," which is located closer to return opening 1412, as the illustrated portion of plume array 1401 of hot air moves toward return opening 1412. Thus, unlike the prior art, in which the portion of the object that is closer to the return opening is exposed to a greater volume of hot air than portions of the object that are farther from the return opening, the air path in accordance with the present invention causes all portions of the surface of the object to be in contact with the same volume of hot air, as illustrated in FIG. 9. Accordingly, the air path provided in accordance with the embodiments of the present invention results in an air flow within chamber 1405 that surrounds object 1406, as shown in FIG. 7B. As a result, the heating of object 1406 is more even.

The new and inventive air path described herein also generates less of a pressure drop as plume arrays 1401,1402, 1408,1409,1410 travel from their respective tubes 1403,1404,1201,1202,1203 through chamber 1405 to return openings 1411,1412. This is significant because it means that the blowers can drive higher volumes of air across object 1406 for a given blower speed than is achievable with prior art techniques. The inventors have experimentally determined that embodiments in accordance with the present invention require approximately one-half the blower speed (expressed in revolutions per minute (RPM)) to deliver substantially the same volume of air (expressed in cubic feet per minute (CFM)). This, in turn, means that the heating apparatus requires less power to operate, and makes less noise.

While this invention has been described in conjunction with exemplary embodiments outlined above and illustrated in the drawings, it is evident that many alternatives, modifications, and variations will be apparent to those skilled in the art. For instance, the techniques disclosed herein—including the new and inventive fluid flow path—can be utilized in any application that requires accelerated or efficient heating of an object. One such application could involve rapidly, but gently, thawing fragile liquids, such as blood. As described above, the terms "heats," "heating," or other variations thereof are intended to mean the transfer of heat to or from an object, and expressly includes cooling. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An apparatus for heating an object using a gas, comprising:
   a chamber for receiving the object;
   a conduit and one or more blowers for providing the gas into the chamber;
   a thermal energy source for heating the gas disposed in the conduit;
   a tube for generating a plume array of the heated gas from the conduit and introducing it into the chamber; and
   a return opening for allowing the gas from the plume array to return from the chamber to the conduit;
   wherein at least a portion of the gas flowing in a cross section of the plume array remains in substantially the same plane while it is in the chamber.

2. The apparatus of claim 1, wherein: the chamber comprises a side wall and a bottom; and the return opening is positioned substantially at or along an intersection of the bottom of the chamber and the side wall of the chamber.

3. The apparatus of claim 1, wherein the heated gas of the plume array is drawn laterally across a surface of the object toward the return opening.

4. The apparatus of claim 1, further comprising a modulator for controlling a flow rate of the heated gas through the tube.

5. The apparatus of claim 1, wherein the tube comprises a tube inlet coupled to the conduit and a tube outlet coupled to the chamber.

6. The apparatus of claim 5, wherein the tube is in the shape of an inverted truncated triangular prism with the tube inlet corresponding to the base of the prism.

7. The apparatus of claim 5, wherein the area of the tube inlet is larger than the area of the tube outlet at a ratio substantially sufficient for forming a tight plume of the heated gas.

8. The apparatus of claim 5, wherein the dimensions of the tube are designed to optimize the formation of a plume of the heated gas having a long and narrow rectangular cross section.

9. The apparatus of claim 1, wherein the gas comprises air and the one or more blowers comprise an air blower that directs the air in the conduit to the tube.

10. The apparatus of claim 1, wherein the gas comprises air and the one or more blowers comprise a variable speed air blower.

11. The apparatus of claim 1, wherein all of the gas in the plume array travels substantially the same distance from the tube to the return opening.

12. The apparatus of claim 1, wherein each portion of the surface of the object that is in contact with the plume array is in contact with substantially the same volume of gas.

13. A method for heating an object, comprising:
providing a chamber for receiving the object;
providing a conduit;
introducing a gas into the conduit;
heating the gas that is in the conduit;
forming the heated gas into a plume array such that the gas flowing in a cross section of the plume array remains in substantially the same plane while it is in the chamber;
introducing the plume array of heated gas into the chamber; and
providing a return opening to allow the gas from the plume array to return from the chamber to the conduit.

14. The method of claim 13, further comprising the steps of: providing a side wall for the chamber; and providing a bottom for the chamber.

15. The method of claim 13, further comprising the step of positioning the return opening substantially at or along the intersection of the bottom of the chamber and the side wall of the chamber.

16. The method of claim 13, further comprising the step of drawing the heated gas of the plume array laterally across a surface of the object toward the return opening.

17. The method of claim 13, further comprising the step of controlling a flow rate of the heated gas through the tube.

18. The method of claim 13, wherein the step of forming the heated gas into a plume array is performed using a tube having an inlet and an outlet.

19. The method of claim 18, wherein the forming step further comprises the steps of coupling the tube inlet to the conduit and coupling the tube outlet to the chamber.

20. The method of claim 18, further comprising the step of providing the tube in the shape of an inverted truncated triangular prism, with the tube inlet corresponding to the base of the prism.

21. The method of claim 18, further comprising the step of providing the tube such that the area of the tube inlet is larger than the area of the tube outlet at a ratio substantially sufficient for forming a tight plume of the heated gas.

22. The method of claim 18, further comprising the step of optimizing the formation of the plume array of the heated gas to have a long and narrow rectangular cross section.

23. The method of claim 13, wherein the step of introducing the plume array of heated gas into the chamber comprises the step of directing the heated gas from the conduit into the tube.

* * * * *